United States Patent [19]

Fulthorp et al.

[11] Patent Number: 5,737,330
[45] Date of Patent: Apr. 7, 1998

[54] SYSTEM AND METHOD FOR THE EFFICIENT CONTROL OF A RADIO COMMUNICATIONS NETWORK

[75] Inventors: Richard J. Fulthorp; Dale K. Smith, both of Renton; David A. Fulthorp, Seattle; Thomas G. Donich, Federal Way, all of Wash.

[73] Assignee: Meteor Communications Corporation, Kent, Wash.

[21] Appl. No.: 584,961

[22] Filed: Jan. 11, 1996

[51] Int. Cl.[6] ............................................. H04L 12/413
[52] U.S. Cl. .................... 370/346; 370/350; 370/448; 370/449; 370/513; 455/502; 455/509; 455/517; 455/525
[58] Field of Search .................................. 370/319, 343, 370/344, 445, 448, 449, 350, 513, 512, 345, 346; 455/34.1, 54.1, 54.2, 51.1, 56.1, 502, 509, 517, 524, 525; 375/356, 366

[56] References Cited

U.S. PATENT DOCUMENTS

| 5,499,386 | 3/1996 | Karlsson ............................ 455/56.1 |
| 5,581,802 | 12/1996 | Erickson et al. ..................... 455/54.2 |
| 5,613,205 | 3/1997 | Dufour ............................... 455/56.1 |

*Primary Examiner*—Benedict V. Safourek
*Attorney, Agent, or Firm*—Seed and Berry LLP

[57] ABSTRACT

A technique for optimizing throughput on a communications channel shared by multiple users. A communications channel that must be shared by a large number of devices has the potential of being very inefficient because of collisions or overlapping of transmissions by the various devices. The system combines a carrier sense, multiple access (CSMA) mode with a time division multiple access (TDMA) mode to achieve a channel utilization greater than 90 percent. The remote units send a poll request to a base station using the CSMA mode and receive a poll signal from the base station with a poll sequence. The remote units send their data in their assigned time slot. The remote units do not have to all be in radio contact with each other to maintain synchronization. Each remote unit selects the base station that it wishes to communicate with based on signal strength of various base stations. The remote units may switch from one base station to another by addressing the selected base station and using the selected base station's synchronization data pattern in radio transmissions from the remote unit. The synchronization data pattern may be different for each base station or may be identical for groups of base stations to provide broader regional control of the communications network. The base station will only communicate with remote units using the synchronization code for that base station. The system also recovers data from a more powerful signal that collides with a weaker signal by examining the received data for the synchronization code from the more powerful signal.

42 Claims, 16 Drawing Sheets

SYSTEM AND METHOD FOR THE EFFICIENT CONTROL OF A RADIO COMMUNICATIONS NETWORK

TECHNICAL FIELD

This invention relates generally to the control of radio frequency communication systems, and more particularly, to a system and method of optimizing utilization of a single channel or frequency of such a communication system.

BACKGROUND OF THE INVENTION

Much work has been done to optimize the access of communications media where the use of a single communications channel must be shared by a large number of users. Common techniques include time-division multiple access (TDMA), polling, token passing, token rings, random access with no sensing, random access with sensing, slot reservation and many others. These techniques have been used over telephone lines, satellite channels, coaxial cables, bus architectures and various types of radio links such as packet radio, cellular telephone, meteor burst, troposcatter and others.

Each of these techniques has its own particular advantages and disadvantages. Any single approach will work well for the situation where the use fits the access method, but will not work as well where the traffic distribution is not optimum. In the field of mobile communications where the sites are not fixed, the traffic demands are irregular, and the link characteristics are dynamic and unpredictable.

In previous installations of mobile radio frequency (RF) communications, a carrier-sense multiple access (CSMA) system has been used. As a particular unit gets data to transmit, it listens to the channel, sometimes called a link, to be sure no other unit is already transmitting. If the link is busy, the unit waits a random amount of time, then listens again. This is repeated until the link is thought to be free, then the unit transmits its channel acquisition request to the destination unit. The CSMA system works well where only a few units have data to transmit at any given time.

In the CSMA system, there is a finite amount of time required to determine if the link is free, and once the unit begins a transmission sequence it can no longer determine if another unit is transmitting. Thus, when multiple units listen for a free link, there is a certain probability that at least two units will begin transmission at nearly the same time because both units determined that the link was free. This transmission collision usually causes both transmissions to be lost because the receiving units can not demodulate the data packets error free. Such collisions also occur when a unit cannot hear another unit that is transmitting and thus mistakenly believes a link is free.

In an RF environment, the transmit power is high enough to damage the receiver unless the receiver is disabled during transmission. Therefore, a unit cannot monitor its receiver during its own transmission to determine if any other unit has transmitted and caused a collision. Thus, classic CSMA collision detection (CSMA/CD) modes can not be used. As discussed in *Telecommunications Protocols and Design*, by Spragins, J.D., Hammond, J.A., and Pawlski, K., Addision-Westly Publishing, 1991, this limits the channel utilization to less than 0.5 of the available bandwidth. This means that 50% of the transmissions in this type of network are lost. As the number of users increases, the result is that even more transmissions are lost.

Another conventional technique to control communications over a single link is to reserve a time slot for each unit. With the slotted reservations system, a base unit (not shown) sends a reservation data packet or list to all remote units (not shown). The reservation data packet tells the remote units when they can each transmit and how long each can transmit. However, the slotted reservation system is not always effective because it only works when all units in any given area can receive each other's transmissions error free to allow them each to determine which unit has the link reserved in the next time slot. Many collisions can still occur. In addition, the slot reservation data packet itself takes up additional transmission time as well, thus reducing the system efficiency. Furthermore, a slotted reservation system may be very inefficient because time slots are allotted for remote units that have no data to transmit. Thus, the link may be unused for a significant percent of time.

Therefore, it can be appreciated that there is a significant need for a system and method for efficiently controlling communication over a single link. The present invention provides this and other advantages as will become apparent through the following description and accompanying drawings.

SUMMARY OF THE INVENTION

The present invention is embodied in a system and method for the control of radio communications. The system comprises a plurality of remote radio units each having transmit and receive capability. Each of the remote units operates in a first mode to transmit a poll request signal to initiate communications and a second mode to transmit data. A base station also having transmit and receive capability receives a plurality of respective poll requests from the plurality of remote radio units and transmits a poll signal to at least some of the remote radio units. The poll signal includes a poll response sequence indicative of a particular time frame in which each of the remote radio units will respond to the poll signal. A poll detection unit in each of the remote radio units detects the poll signal. A control unit in each of the remote units controls transmission of the data in the particular time frame such that each of the remote radio units transmits data in the second mode in the time frame corresponding to the response sequence in the detected poll signal.

In a preferred embodiment, the first mode of operation is a carrier sense multiple access (CSMA) mode. The system further includes a carrier sense circuit in each of the plurality of remote radio units to detect the presence of the carrier frequency. Each of the remote radio units delays random length of time if the carrier sense circuit detects the presence of carrier frequency and permits transmission in the CSMA mode only when the carrier sense circuit does not detect the presence of the carrier frequency.

The system may also include a sequence list within the base station, with the sequence list containing data used to form the poll response sequence. The poll response signal from the remote radio units contains data indicative of the communications interval for each of the remote radio units. The poll detection unit receives the communications interval data and alters the sequence list accordingly such that a poll response sequence reflects the altered sequence list.

The poll request signal from the remote radio unit may contain data indicative of a communications interval for each of the remote radio units. The base station periodically transmits the poll signal and the poll sequence is altered in each of the periodically transmitted poll signals in response to the communication data interval for each of the plurality of remote radio units. The poll signal may also include first and second portions, with the first portion including a plurality of synchronization data bits to indicate the start of the poll signal, and the second portion including the poll response sequence. In addition, the poll signal may include acknowledgment data bits for each of the plurality of remote radio units to indicate prior reception of the additional data from each of the remote radio units. The poll signal may also include an error check data portion at the end of the poll signal with each of the remote radio units including an error detection circuit to detect transmission errors using the error check data portion.

Each of the remote radio units can periodically transmit the poll request signal to the base station, and the base station uses the periodically transmitted poll request signal to alter the poll response sequence. In a presently preferred embodiment, the system also includes a global positioning system receiver to receive position data. The position data is included in the additional data transmitted by the remote radio units. To help assure that radio communications is maintained between the remote radio units, the remote radio units transmit a data frame to the base station. The data frame has a frame synchronization sequence, a data portion, and an error detection portion. A threshold detector within the base station detects the signal strength of the received radio signals and a receiver lock circuit coupled to the threshold detector locks the base station onto a received radio signal containing data frames. The receiver lock circuit initially locks the base station onto a first received radio signal from a first remote radio unit and locks onto a second received radio signal from a second remote radio unit if the detected signal strength of the second received radio signal is greater than the detected signal strength of the first received radio signal by a predetermined level. A memory within the base station is sized to fit at least two data frames. The processor detects the frame synchronization sequences from the received radio signals and processes received data frames. The processor stores the received data frames in the memory and processes a first stored data frame received from the first remote radio unit beginning at the frame synchronization sequence and checking the data frame for an error using the error detection portion of the data frame. The processor accepts the first stored data frame if the error detection portion indicates that no error occurred. If the error detection portion of the first stored data frame indicates that an error occurred in the first stored data frame, the processor analyzes the memory to detect another frame synchronization sequence corresponding to a second stored data frame received from the second remote radio unit beginning at the frame synchronization sequence and checks the data frame for an error in using the error detection portion of the data frame. The processor accepts the second stored data frame if the error detection portion indicates that no error occurred. The processor accepts no data frame if the error detection portion indicates that an error occurred in the second stored data frame.

In one embodiment, the error detection portion is a cyclic redundancy check code which the processor uses to determine whether a transmission error occurred in the first and second stored data frame.

The remote units may also communicate with more than one base station using a single radio frequency. Each radio station uses a fixed synchronization data pattern to control communication with a remote radio unit. A first base station includes a first fixed synchronization data pattern and will communicate with remote radio units only if the remote radio unit uses the first fixed synchronization pattern. A second base station uses the second fixed synchronization data pattern different from the first fixed synchronization data pattern to control communication with tile remote radio unit. The second base station communicates with the remote radio unit only if the remote radio unit uses the second fixed synchronization data pattern. A receiver portion in the remote radio unit receives signals from both the first and second base stations. The receiver portion determines signal strength from the received radio signals from both the first and second radio stations and selects either the first or second base station for subsequent transmissions based on the signal strength. The remote radio unit transmits the frame synchronization portion of the data frame, which includes the first fixed synchronization data pattern if the receiver portion determines that the signal strength from the first base station was greater than the signal strength frown the second base station and includes the second fixed synchronization data pattern if the receiver portion determines that the signal strength from the second base station is greater than tile signal strength from the first base station. In this manner, the remote radio station can communicate with either the first or second base station.

The remote radio unit may also switch between the first and second base stations. The receiver portion continues to monitor the received radio signals from the first and second base stations, and alters the included fixed synchronization data pattern if the signal strength from the first and second received radio signals changes. In this manner, the remote radio unit switches base stations with which it is communicating.

DETAILED DESCRIPTION OF THE INVENTION

The present invention is capable of controlling communications among a plurality of transmitters on a single frequency. The transmission frequency, sometimes called a channel or link, is utilized at a high efficiency. The invention performs various functions such as: (1) managing network connectivity to allow remotes to roam freely within an infrastructure of base stations; (2) using a combination of CSMA and TDMA modes of operation; (3) changing operating modes efficiently; (4) capturing the transmissions of contending units as much as possible when collisions do occur; and (5) reducing the contention between devices in close proximity and devices located distantly.

Figure 1:
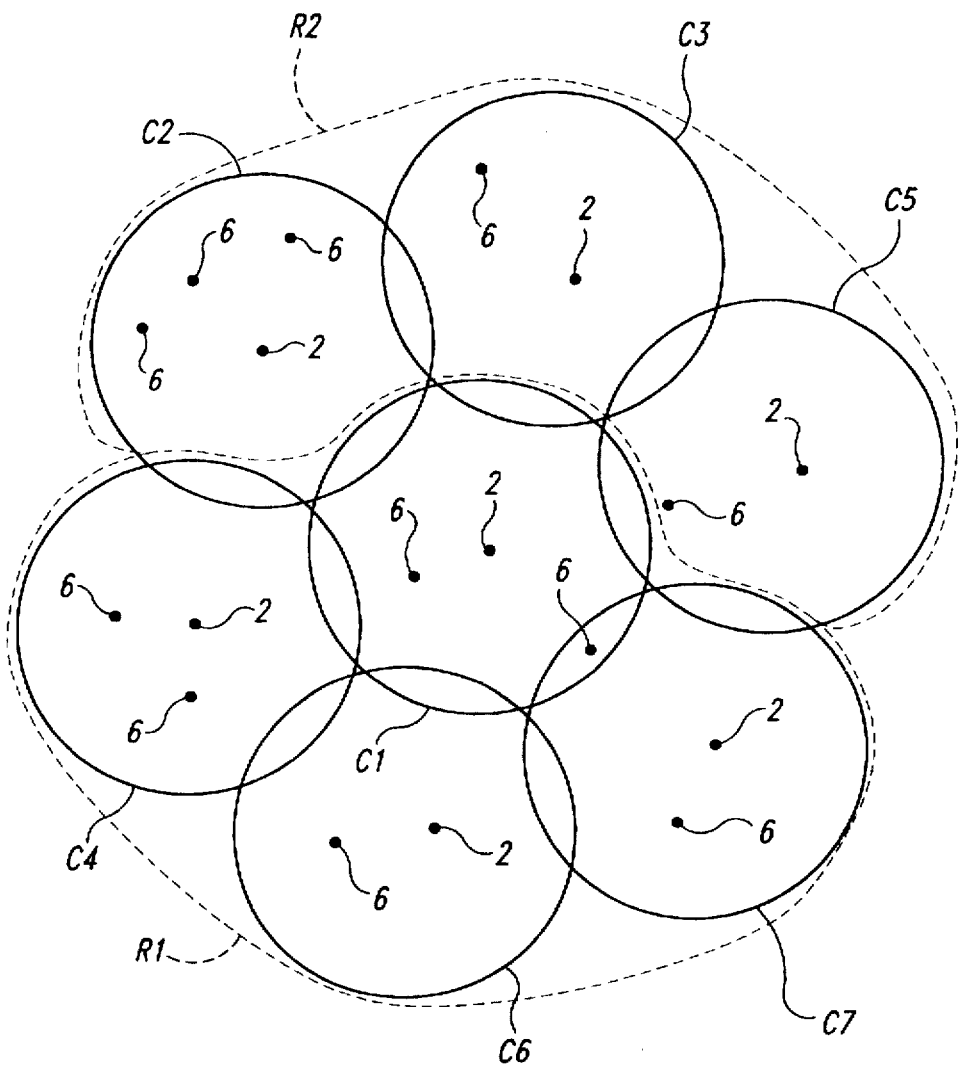
FIG. 1 is a diagram illustrating the cell interleaving of the present invention.

The communication system utilizes a series of base stations and a large number of remote units. The base stations provide a large overlapping area of coverage, as illustrated in FIG. 1. The different areas of coverage are illustrated as cells C1 to C7. The term "cell" is frequently used to describe a communications network, such as a cellular telephone system, where there is a control site within each cellular telephone cell. However, the present invention is significantly different from a cellular telephone system. The different cells in the cellular telephone system operate at different frequencies or channels and each cellular telephone changes channels depending on the particular cell in which it is operating. In contrast, the cells C1 to C7 of the present invention all operate on the same frequency or channel. All radio transmission in all cells C1 to C7 operate on the same channel.

Each of the cells C1 to C7 contains a single base station 2, which communicates with a large number of remote units 6. For the sake of simplicity, only a few of the remote units 6 are shown in FIG. 1. However, in a typical installation, there may be dozens or hundreds of remote units 6 operating in the cells C1 to C7. The cells C1 to C7 may also be grouped into regions R1 and R2, indicated by the dashed lines in FIG. 1, to provide broader regional control of the communications network. As will be described in detail below, the base stations 2 within the region R1 are configured to ignore radio transmissions from base stations and remote units 6 in the region R2.

Figure 2:
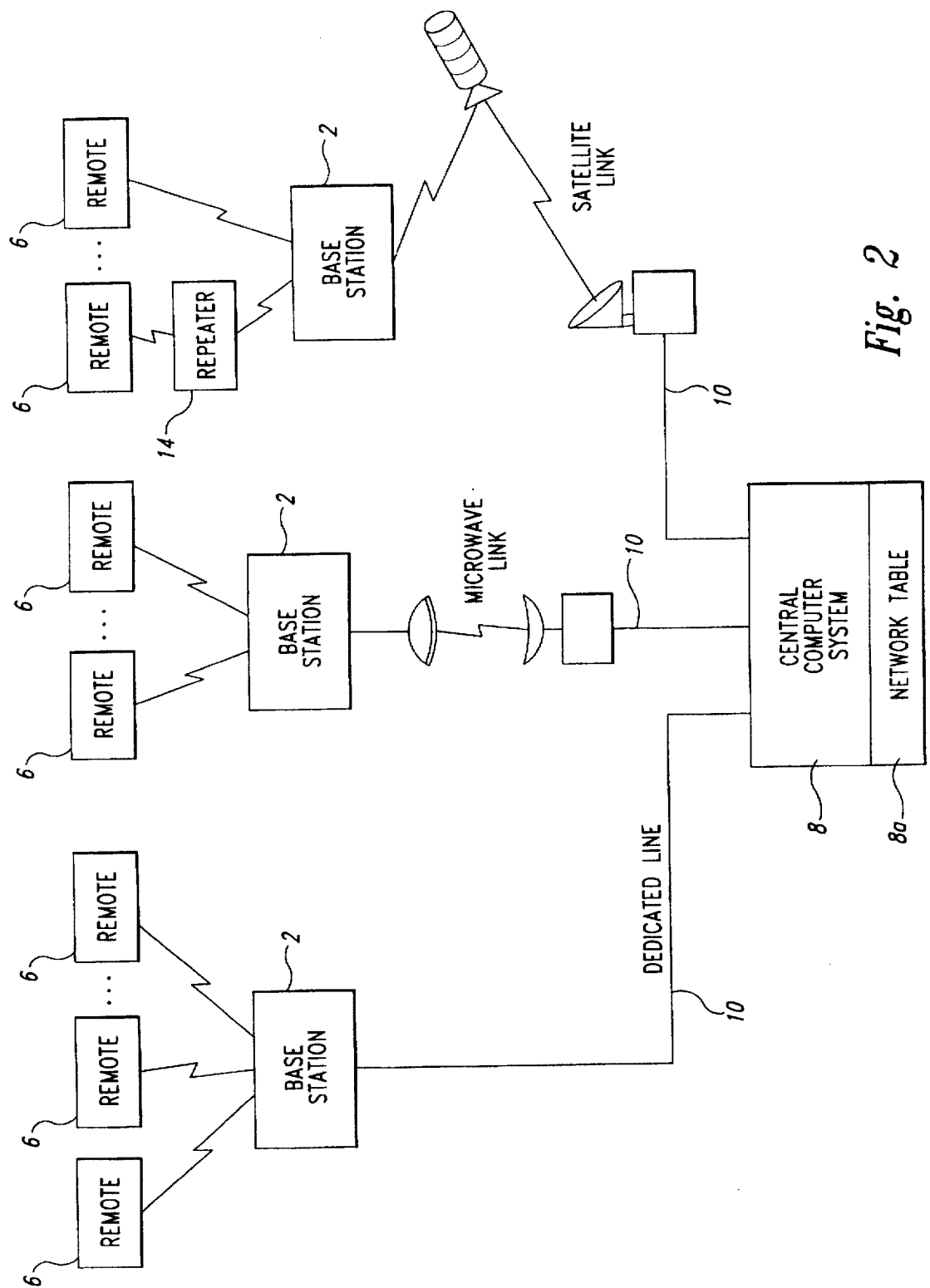
FIG. 2 is a block diagram of the communication system of the present invention.

As shown in the functional block diagram of FIG. 2, the base stations 2 are linked to a central computer system 8 through high speed data links 10, such as dedicated telephone lines, satellite links or microwave links. The base stations 2 are installed far apart from one another in locations that provide coverage over all portions of the topology to be serviced. Although the cells C1 to C7 in FIG. 1 are illustrated as circular, it is apparent that the actual coverage may vary from one cell to the next. For example, geographical features, such as mountains, will alter the pattern of coverage. The present invention is clearly not limited to the circular coverage illustrated in FIG. 1. Furthermore, the present invention is illustrated with seven cells C1 to C7. However, the present invention can work with more or less cells and is not limited to the specific example of seven cells.

An explanation of terminology used in the present description will assist the reader in understanding the invention. Base stations 2 are typically fixed-location, ground based RF modems that are connected to the computer system 8. In a normal installation, there is one base station 2 in each cell C1 to C7. Remote units 6 are mobile RF modems that are installed in mobile vehicles, ships and aircraft or are transportable and can be erected in the field. Because the remote units 6 are mobile, there is a variable number of remote units 6 within each cell C1 to C7 at any given time. The number of remote units 6 in any of the cells C1 to C7 can change quickly. For example, the remote unit 6 may be installed in an aircraft that moves from one of the cells C1 to C7 to the next at high speed.

The base stations 2 do not need to communicate with one another except where the installation of a repeater 14 is necessary at a location where there is no access point into the high speed data link 10. The repeater 14 is a RF device that receives data from one or more remote units 6 and relays (or repeats) the data to the base station 2 to which the repeater is assigned. The repeater 14 acts like a base station 2 as far as communicating to remote units 6 is concerned, but routes all data destined for the central computer system 8 to its assigned base station. The repeater 14 to base station 2 links are to be minimized as they will need to use the CSMA transmission time to relay data from remote units 6 to base stations. Alternatively the repeater 14 could be used to relay data from a base station 2, which has no access to the high speed data link 10, to another location, such as a different base station, that does have access to the high speed data link. Once the base stations 2 have received data from the remote units 6, conventional techniques are used to communicate between the base station 2 and the central computer system 8. The present invention is directed to the control of communications between the remote units 6, the base stations 2, and repeaters 14.

Figure 3A:
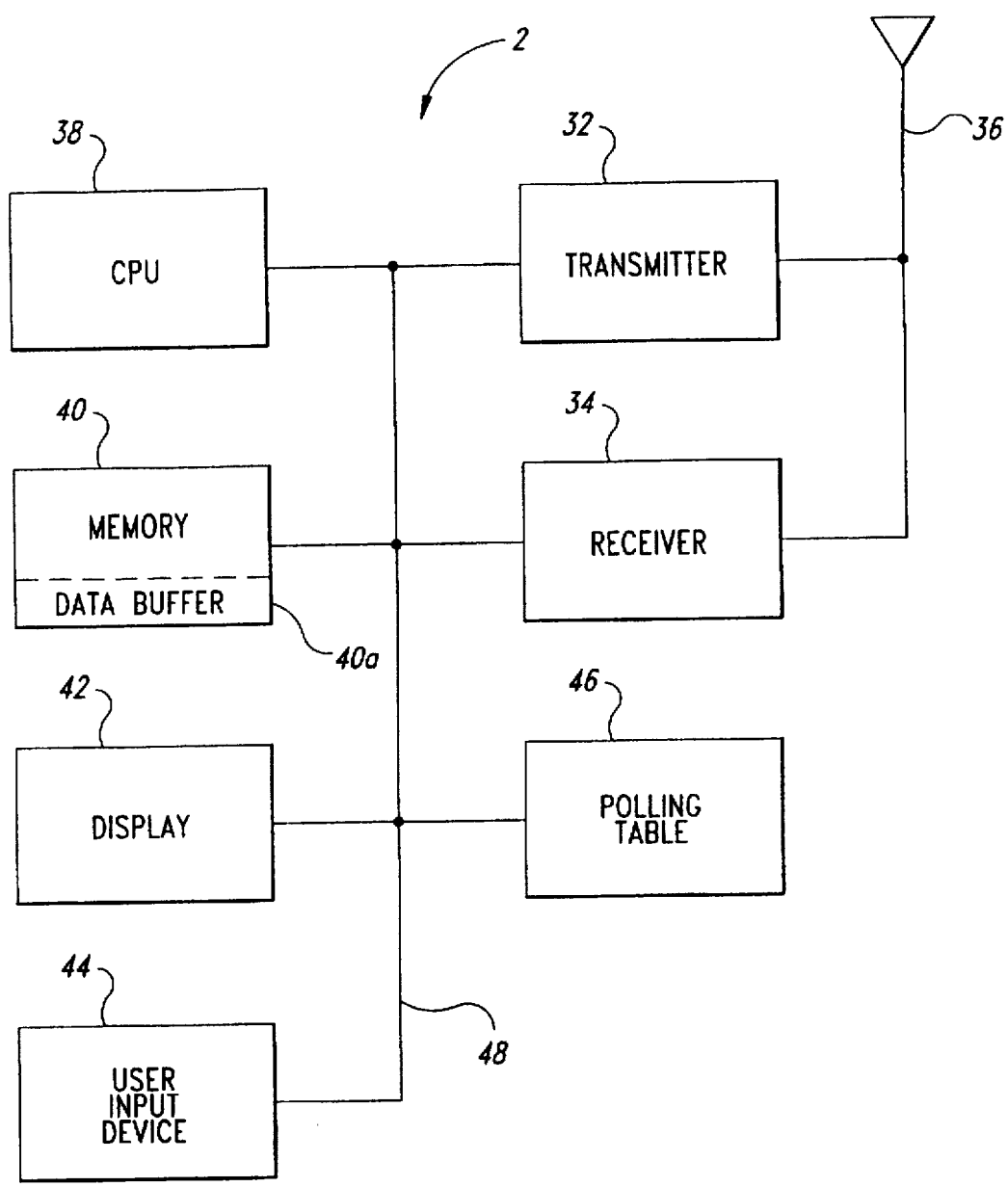
FIG. 3A is a functional block diagram of a base station of the present invention.
Figure 3B:
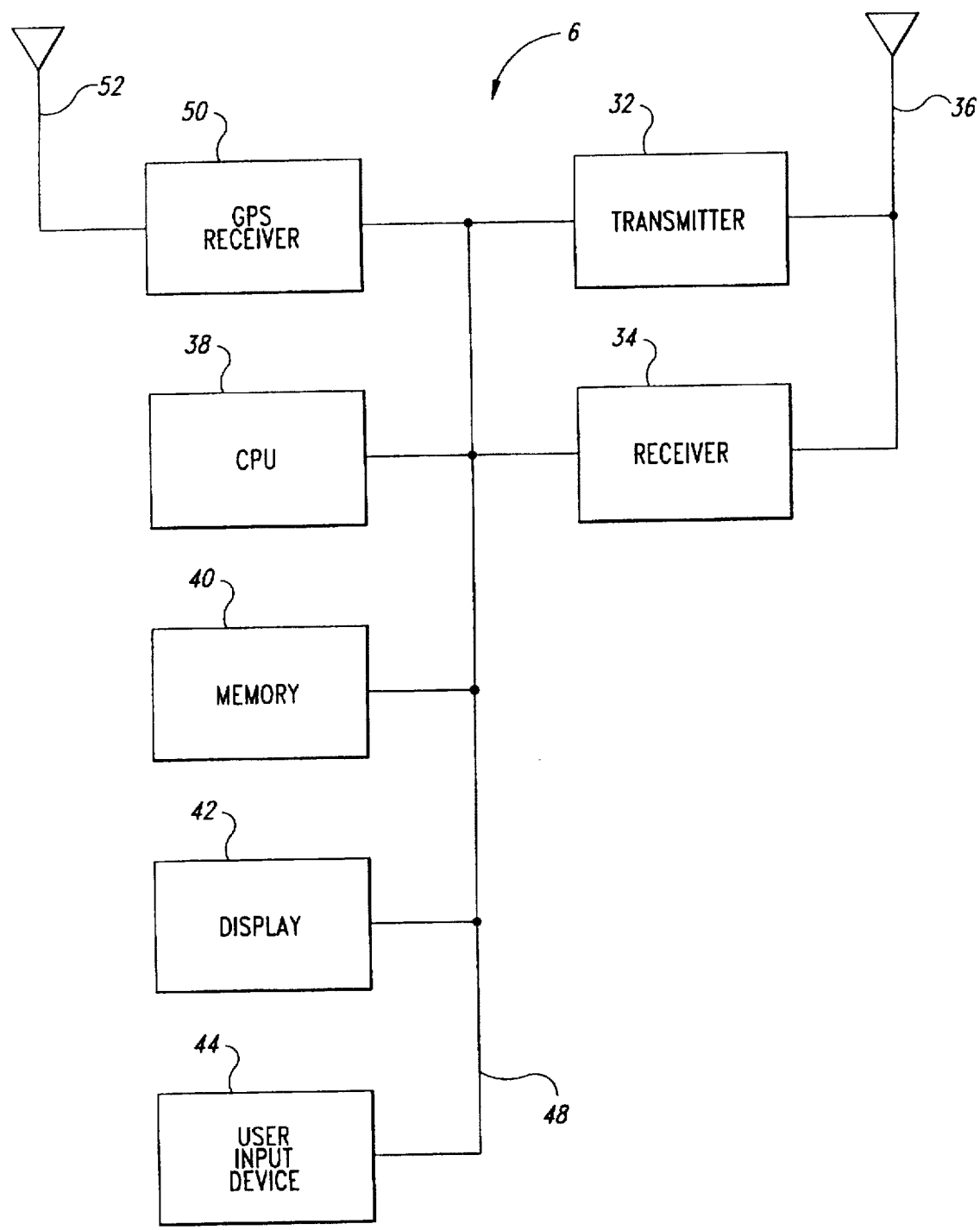
FIG. 3B is a functional block diagram of a remote unit of the present invention.

The present invention is embodied in a system 30 illustrated in the functional block diagrams of FIGS. 3A and 3B. The system 30 includes base stations 2 (FIG. 3A) and remote units 6 (FIG. 3B). The base station 2 illustrated in FIG. 3A includes a transmitter 32 and receiver 34, which are coupled to an antenna 36. The transmitter 32 and receiver 34 are used to transmit and receive digital data and may be termed a RF modem. The base station 2 also includes a central processing unit 38 and a memory 40, which may include both random access memory (RAM) and read only memory (ROM). The memory 40 also includes a data buffer 40a. A display 42 and user input device 44 are coupled to the CPU 38 by a bus 46, which may carry power and control signals as well as data. A polling table 48 is used to keep track of the remote units 6 currently communicating with the base station 2. The polling table may be part of the memory 40. The operation of the polling table 48 will be discussed in detail below. The system 30 includes software in the memory 40 that controls the base station 2 and causes it to perform in accordance with the present invention.

The system 30 also includes remote units 6, illustrated in FIG. 3B. The remote units 6 contain many of the same components described above for the base station 2. For the sake of brevity, the description of these components will not be repeated. In a presently preferred embodiment, the remote units 6 also include a global positioning system (GPS) receiver 50, which is coupled to an antenna 52. Certain components of the system 30, such as the transmitter 32, receiver, 34 and GPS receiver 50 are well known in the art and need not be described in detail.

The system 30 utilizes a combination of TDMA and CSMA operating modes to provide collision avoidance. The remote units 6 can easily switch between the two operational modes. Each base station 2 in the same region uses a correlation code that permits it to communicate only with remote units 6 using the same correlation code. For example all remote units 6 communicating with the base station 2 in cell C3 in region R2 will uses the correlation code associated with the region R2. This prevents the base station 2 in cell C3 from inadvertent communication with remote units 6 currently assigned to the base station 2 in the region R1. It should be noted that the remote units 6 are not restricted to communication only with the base station 2 in whose cell the remote unit is located. For example, the terrain may prevent the remote unit 6 in cell C1 from communicating with the base station 2 in cell C1. However, the base station 2 in cell C4, also in region R1, may be able to communicate with the remote unit 6. Each remote unit 6 can change its correlation code to switch communication to a new base station 2 in a different one of the cells C1 to C7 or regions R1 and R2. In this example, the remote unit 6 in the cell C3 in region R2 alters its base identification code and correlation code to match the base identification and correlation code of the base station 2 in the cell C1 in region R1 and communicates with that base station. This permits remote units 6 to freely communicate with the base station 2 that can most effectively process the communications.

In another inventive aspect, the base station 2 will attempt to lock onto the strongest signal and communicate with the remote unit 6 transmitting the most powerful signal. In a conventional system, the two competing or colliding signals will cause a reception error and neither signal will be properly processed. With the system 30, if a collision does occur, the base station 2 will lock onto the more powerful signal. However, data from both received signals are stored in a data buffer 40a. The base station 2 then analyzes the received data in the data buffer 40a to recover data from the more powerful transmission.

The various components of the system 30 and their operation may now be discussed in greater detail. Each base station 2 is assigned a polling interval that does not overlap or conflict with the base stations in adjacent cells C1 to C7. Polling intervals in adjacent cells are interleaved to minimize contention during the time each base station 2 polls the remote units 6 operating within its cell. For example, base station 2 in cell C5 might poll at a 30 second interval starting at offset 10 seconds in each 30 second interval with a duration of 5 seconds. Another base station 2 in cell C6 could then poll at a 30 second interval starting at offset 0 seconds in each 30 second interval with a duration of 5 seconds. The interval width and offset from the first second of each minute can be set as required for a particular system topology and expected data loading. The polling interval and duration is configured into each base station 2 on installation. However, the polling interval and duration can be changed by the central computer system 8 by simply transmitting new configuration data to the base stations 2. Thus, the system 30 can be dynamically reconfigured to accommodate changes in the data loading.

The base stations 2 in this type of network need to be time-synched. This is accomplished periodically by a network monitor function that runs in the central computer system 8. The central computer system 8 periodically transmits the time of day to the base stations 2. This procedure maintains time synchronization to approximately±1 second. The system 30 does not require more precise (e.g., microsecond) accuracy because there is typically additional time between the end of a polling transmission and the designated duration so that precise timing is unnecessary. In addition, the system 30 selects the polling interval so that adjacent cells C1 to C7 do not poll in adjacent time frames. For example, the polling interval for the cell C3 may be followed by the polling interval for the cell C6 so as to minimize potential collisions if the base station in the cell C3 polling transmission extends into the polling interval for the base station in the cell C6 or if the base station in the cell C6 begins transmitting early due to the less precise time synchronization.

The remote units 6 detect which base stations 2 it can receive and chooses one base station to communicate with. The remote unit 6, using the CSMA protocol, acquires the RF channel and transmits its TDMA channel request to the base station 2. Although a transmission collision is possible, it is relatively unlikely because the small amount of data that must be transmitted in a TDMA channel request requires only a short transmission time. In addition, the use of random time delays in the CSMA mode, combined with the short transmission time, minimizes the chances of a collision. The base station 2 registers the remote unit 6 as one to poll, inserts the necessary data into its polling table 46 and acknowledges the transmission from the remote unit. Any previous base station 2 that was polling that remote unit 6 will not receive data from the remote unit and will time it out, and remove it from its polling table 46. Thus, only one base station 2 at a time will communicate with any remote unit 6, and it is the remote unit that determines which base station it wants.

If the remote unit 6 fails to get acknowledgments or polls from its selected base station 2 for a predetermined period of time, the remote unit will start the process again by choosing a different base station. This will be necessary when the remote unit 6 goes out of range from its selected base station 2, or if the RF link is not reciprocal due to local noise and terrain effects. The polling table 46 in the base station 2 is updated each time a remote unit 6 moves to a different base station.

The polling tables 46 in each base station 2 are used by the central computer system 8 for routing outbound message packets to the remote units 6. The central computer system 8 gives a message to the last base station 2 to have communication with the destination remote unit 6. The base station 2 then uses network tables 8a in the central computer system 8 to find the shortest path to the destination remote unit 6. The network tables 8b are the lists of remote units 6 with which the base station 2 is communicating. The central computer system 8 has a master list of all remote units 6 that are currently communicating with base stations 2 and identifies which base station is communicating with which remote units. For example, the central computer system 8 may wish to deliver a message to a particular remote unit 6. The central computer system 8 uses the network tables 8a to determine which base station is currently communicating with the destination remote unit 6 and will route the message to the destination remote unit 6 using the base station 2. It should be noted that the central computer system 8 may route the message indirectly to the destination remote unit 6. This may include routing through repeaters 14 (see FIG. 2) as well as multiple remote units 6 to deliver the message to the intended destination.

The base stations 2 and remote units 6 use a combination of the CSMA and TDMA modes to allow the transmission of less frequent unsolicited data, and the transmission of very frequent high volume data. The conventional CSMA mode allows transmission of low volume, less frequent data. The persistence that each remote unit 6 uses to gain access to the channel is fixed at a level that reduces the probability of collision, but increases the delay between transmissions to allow several hundred remote units to share the channel.

The TDMA mode is used to allow the transmission of high volume, more frequent data, by multiplexing the channel among all the remote units 6 that have data ready to transmit without wasting transmission time for those remote units that do not have data to transmit. The TDMA mode provides a fixed time slot for each remote to transmit in, thus eliminating collisions.

The system 30 synchronizes time slots for TDMA communication in a manner that does not depend on each remote unit 6 having an expensive time clock. The transmit bit clocks of the remote units 6 have to be closely aligned to the desired bit rate, but each poll received from the base station 2 will resynchronize each remote unit 6 from the time it received the last bit of the poll frame. The timing diagram of FIG. 4 shows poll transmissions 600 and 602 from the base station 2.

Figure 4:
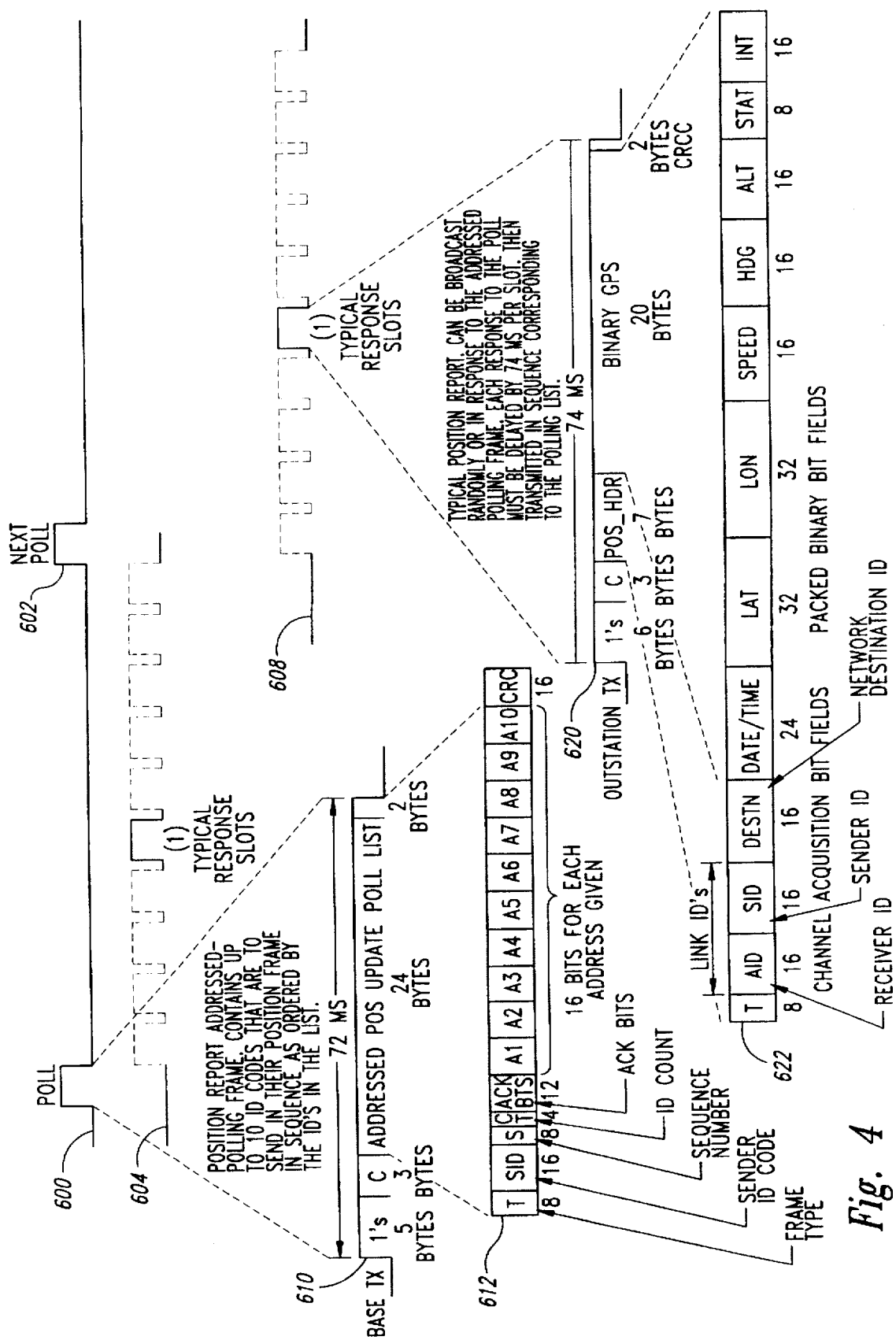
FIG. 4 is a TDMA poll synchronization timing diagram used by the system of the present invention.

The response frames 604 and 608 of the remote units 6 are also shown in FIG. 4. Each remote unit 6 will transmit its response repeatedly within the response window, but will not key (turn on) its transmitter 32 (see FIG. 3B) until its particular slot time. For example, the first remote unit 6 keys its transmitter 32 in time slot 1. The second remote unit 6 transmits its response in time slot 1 with its transmitter 32 off, then transmits its response again in time slot 2 with its transmitter turned on, and so forth. Thus, each remote unit 6 continuously transmits its data in each time slot to maintain the proper timing relationship with the other remote units. At its designated time slot, the remote unit 6 keys or activates its transmitter 32 to actually transmit the data frame to the base station 2.

An example of the type of data used in the TDMA slot scheduling by the system 30 is shown in FIG. 4. The data used in the example of FIG. 4 is position data from the GPS receiver 50 (see FIG. 3A) from remote units 6. This example is at 4000 bits per second, making the time to transmit a single 8-bit byte equal to 2 milliseconds.

A poll frame 610 is transmitted from the base unit 2. The poll frame 610 includes 5 bytes of 1's, a 3 byte correlation pattern, 24 bytes of poll data 612 and a 16 bit CRCC value. The poll data 612 is expanded to show its components. The poll data 612 includes a frame type byte indicating the type of data being transmitted, a 16 bit identification (ID) of the polling base station 2, an 8-bit frame sequence number which is incremented for each transmission, a 4-bit count of the number if ID's in the ID field (max.=10 in this example), 12 acknowledge (Ack) bits, with only 10 Ack bits being used in this example, where each Ack bit corresponds to one of the response frames received from remote units 6 in the preceding poll slot, and from 1 to 10 16-bit remote ID codes of the remote units that are to respond to this particular poll frame.

In response to the poll signal 600, the remote units 6 transmit their data in a time sequenced series of response frames 608. The details of the individual remotes response frame 608 are shown at 620. Each response frame 622 includes 5 bytes of 1's, the 3 byte correlation pattern, a response data field 622, and a 16 bit CRCC code. An example of the data field 622 for GPS data is shown in FIG. 4. The data field 622 for GPS data includes an 8-bit frame type code indicating the type of data being transmitted by the remote unit 6, a 16 bit ID of the base station 2 to receive the response frame 620, the 16 bit ID of the remote unit 6 sending this particular transmission, a 16 bit ID of the network unit that the data is to be routed to, a 24 bit data and time code of when the GPS data was read, a 32 bit latitude, a 32 bit longitude, a 16 bit speed, a 16 bit heading, a 16 bit altitude, a 8-bit status code, and a 16 bit polling request interval. Those skilled in the art will recognize that the system 30 is not limited to data types illustrated in the specific examples presented herein.

To orchestrate the changes in operating mode as efficiently as possible, each base station 2 uses the polling table 46 (see FIG. 3A) to maintain a list of remote units 6 that are currently requesting to send a high priority, time-critical, data packet of a known type and length. There can be any number of different types, with different types of data packets requiring different slot sizes. The base station 2 keeps the requested interval from each remote unit 6 in the polling table 46 as well. The remote unit 6 sends its request for TDMA service to the base station 2 using the lower priority CSMA mode of operation. The request contains the data type and desired transmission interval. This one request is all that is required until the remote unit 6 chooses a different base station 2. The base station 2 will then schedule the remote unit 6 in its TDMA polling interval as often as required to meet the service level requested by the remote unit.

When a timer (not shown) in the base station 2 indicates it is time to allow remotes to transmit this critical information using the TDMA mode, the base station senses a free channel in the CSMA mode, then transmits a poll frame that contains the data type and a list of ID numbers of the remote units 6 that will be allowed to transmit, as shown in FIG. 4. Each of the remote units 6 that receives the poll transmits its data, of the corresponding type, in a slot that is determined by the position of its ID in the poll frame and for a maximum time indicated by the polled data type. Note that remote units 6 do not depend on hearing the other remote units in the list transmit their data as the other remote units may be out of range or blocked by the terrain from each other while they each can hear the base station 2. Each remote unit 6 can transmit its response at the correct time by transmitting its data in all of the slot positions, but only keying the RF transmit power in the transmitter 32 (see FIG. 3B) when the desired slot is being transmitted.

Any other remote units 6 that receive the poll, but do not see their ID in the poll list, hold off their CSMA transmissions long enough for all of the poll responses to be completed, thereby eliminating any chance for collision. Each poll frame is numbered with an increasing sequence number and contains acknowledgment bits that correspond to slot positions for which data was correctly received in the previous poll interval. The acknowledgment bits and poll sequence number lets the remote units 6 know if their previous data transmission was received correctly by the base station 2. If it was not, the remote unit 6 waits for another poll containing its ID number to transmit the data again. Typically, each poll sequence will allow for at least 10 response slots for each poll, but any number may be used.

The base station 2 works its way through its polling lists until all data has been received correctly. The base station 2 will then wait for the next polling interval before repeating the process again. The time between polling sequences is utilized for normal CSMA type transmissions.

Figure 5A:
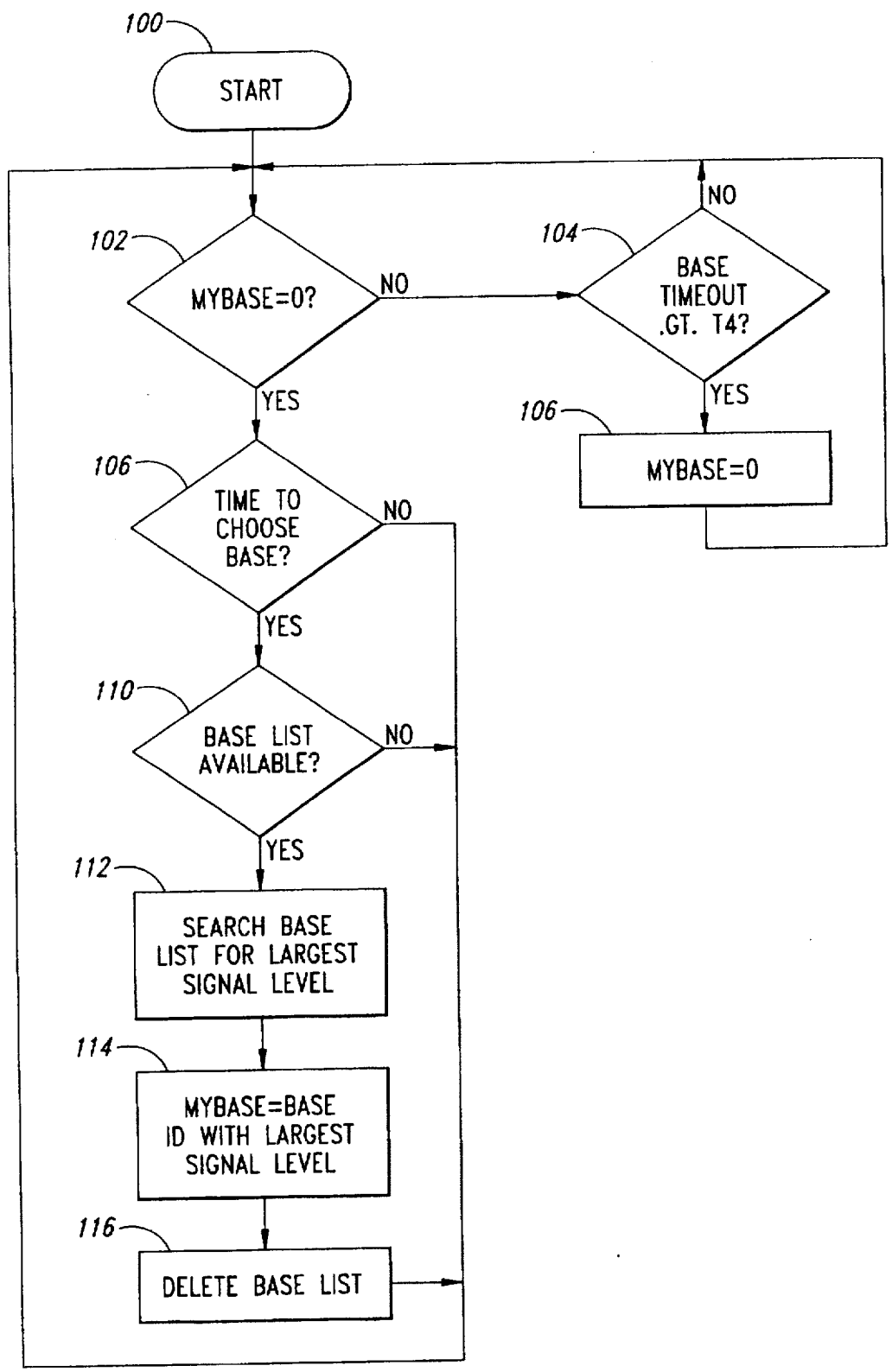
FIGS. 5A and 5B together are a flowchart of the network level operation of the remote units of the system of FIG. 3B.

The network functions of the remote units 6 provide the capability for each remote unit to independently choose its own base station 2. The operation of the remote unit 6 to select the base station 2 and receive data from the base station is illustrated in FIG. 5a. At the start 100, the remote unit 6 powers up with no base station 2 selected. This is indicated at decision 102 with the remote unit 6 determining whether any base station has been selected with a parameter "Mybase" indicating the selected base station 2. If a base station 2 has been selected, the result of decision 102 is NO, and the system 30 moves to decision 104 to test whether it has timed out. If a time-out has occurred, the result of decision 104 is YES and the system 30 resets the parameter Mybase in step 106 and returns to decision 102 to initiate the selection of a new base station 2. As long as the base station 2 has been selected and it has not timed out, the system 30 remains in the loop between decision 102 and decision 104 and maintains communication with the selected base station. Each time the remote unit 6 receives communications from the base station 2, the time-out will be renewed.

If there is no base station 2, then decision 102 branches to decision 108 where a check is made to determine if a new base station should be chosen. This is normally done only once a minute to give the remote link level time to accumulate some receptions from any base stations 2. If it is not time to choose a new base station 2, the result of decision 108 is NO and the system 30 loops back to decision 102. If it is time to select a new base station 2, the result of decision 108 is YES and the system 30 moves to decision 110 to determine if a base list exists. The base list is a list of base stations 2 from which the remote unit 6 is receiving RF transmissions as well as an indication of the strength of the received RE transmissions. It should be noted that tile base list at decision 110 will exist if the link level has received some transmissions from base stations 2. In step 114, the remote unit 6 searches the base list for the base station 2 with the strongest average signal level. The base station 2 with the highest average signal level is selected for communication with the remote unit 6 and the parameter Mybase is set to the selected base station in step 114. In step 116, the remote unit 6 deletes the base list. Thus, the remote unit 6 receives transmissions from one or more base stations 2 and determines the base station with which it will communicate. It will communicate with the selected base station 2 until there is a loss of communications with that base station that results in a time-out and the selection of a new base station.

Figure 5B:
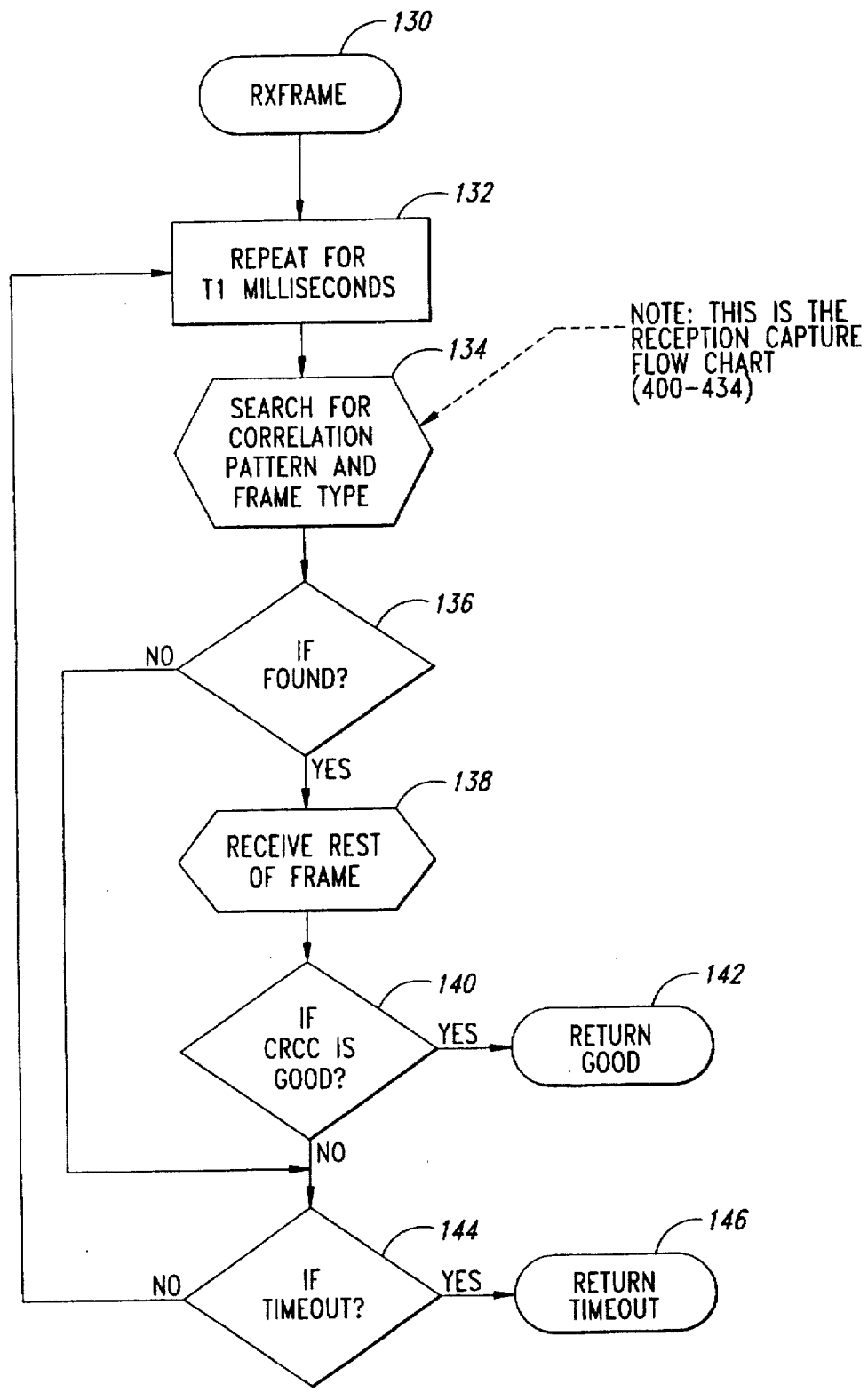

The technique used by the remote units 6 to receive data frames from the base station 2 is also illustrated in FIG. 5B. The process of receiving data frames in the remote unit 6 is used in several other portions of the system 30. For the sake of brevity, subsequent references to the reception of data frames illustrate the process as a single step. For example, the step "RXFRAME" is shown in the flowcharts of FIGS. 7A, 7B, 8A, and 8B. Moreover, it should be understood that references to the single step "RXFRAME" involves the steps illustrated in the flowchart of FIG. 5B. The process of receiving data frames begins at 130. The process illustrateted steps 130 to 146 is used to wait for a given number of milliseconds to listen for a valid reception from another remote unit 6. At step 132, the remote unit 6 sets up a timing loop to continue searching until tile time has elapsed. The time-out value of the timing loop is provided by the calling routine and depends on what state the process is in. In step 134, the system 30 searches for a valid correlation pattern to find the next beginning of frame sequence and frame type code. The details of the correlation pattern and frame sequences are provided below. In decision 136, the system 30 determines whether a frame sequence is found. If a frame sequence has been found, the result of decision 136 is YES and the system 30 receives the remaining portions of the data frame in step 138. If no frame sequence was found, the result of decision 136 is NO, and the system 30 flow branches to step 144.

The length of the data frame will depend on its type, and the CRCC is usually the last two bytes of the data frame. In decision 140, the system 30 tests for a valid CRCC. If the CRCC is valid, the result of decision 140 is YES and the data frame subroutine returns a "good" flag to the calling routine in step 142. If the CRCC was not valid the result of decision 140 is NO. In that event the system 30 moves to decision 144 to determine if a time-out occurred. If a time-out has not yet occurred, the result of decision 144 is NO and the system 30 loops back to step 132 to continue trying to find a good data frame. If a time-out has occurred, the result of decision 144 is YES and the system 30 returns a time-out flag to the calling routine in step 146.

Figure 6:
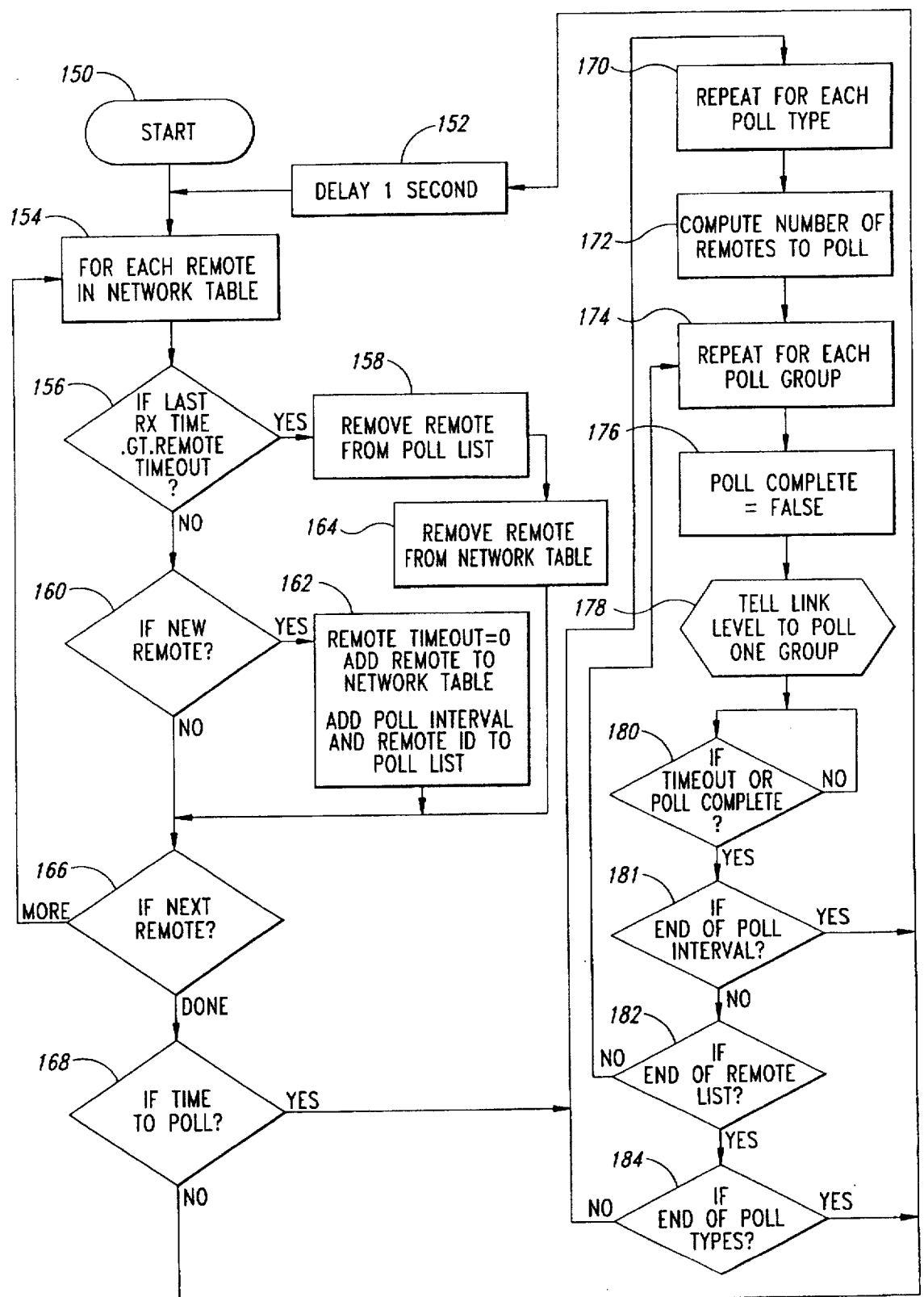
FIG. 6 is a flowchart of the network level operation of the base stations of the system of FIG. 3A.

The base station 2 also processes data frames to be transmitted to the remote units 6 and received from the remote units. The operation of the base station 2 to process data frames is illustrated in the flowchart of FIG. 6. The base station 2 begins its network processing at a start 150. A one second delay is shown at step 152 to indicate that some small time can pass between iterations of the loops. At step 154, the network table (not shown) is used to look at the status of each remote unit 6. The network table is a list of the remote units 6 with which the base station 2 is currently communicating. It should be noted that the central computer system 8 (see FIG. 2) contains a list of all remote units 6 currently operating and the identification of the base stations 2 with which the remote units are communicating. Each base station 2 also maintains a network table, but only for the particular base station. However, the central computer system 8 may query the network table in the base station 2 to determine with which base station a particular remote unit 6 is currently in communication. In decision 156, the base station 2 determines whether the time from the last reception from any remote unit 6 has exceeded a remote-down timeout. If the remote-down time out has been exceeded for any remote unit 6, the result of decision 156 is YES, and the system 30 removes that remote unit from the poll list in step 158 removes the remote from the polling table 46 (see FIG. 3A). In step 164, the system 30 removes that remote unit 6 frown the network table. When the remote unit 6 is removed from the network table in the base station 2, the base station will no longer communicate with the particular remote unit. In addition, the base station 2 reports the change in the network table to the central computer system 8 (see FIG. 2), which updates the central network table. It should be noted that, when the remote unit 6 switches to communication with another base station 2, that base station will update its own network table and relay the change in status to the central computer system 8, which updates its network table. The end of the list is tested at decision 166. The existence of new remote units 6 is tested for in decision 160. If there is a new remote unit 6, its time-out is initialized, its ID is added to the network tables and its polling interval is added to the polling table 46 in step 162.

The polling table 46 is checked at decision 168 to see if any remote unit 6 needs to be polled. If not, then the system 30 loops back to step 152. It should be noted that each remote unit 6 has previously requested its own polling interval. If any remote unit 6 needs to be polled, the result of decision 168 is YES and the base station 2 initiates the polling process. The base station 2 must determine which remote units 6 are to be polled in the current cycle. Some remote units may have requested a long polling interval while other remote units may have requested a short polling interval. Thus, for a given polling cycle, not all remote units 6 will be polled by the base station 2.

If some polling is required, a nested process begins at step 170 to loop for each type of polled data. There may be many different types of polled data, with each data type having its own frame format and size. At step 172, the system 30 computes the number of remote units 6 to poll. Typically the remote units 6 are polled in fixed size groups (10 for example) until all have been serviced. When all poll types have been completed at step 184, the process starts again at step 152.

The process of polling individual groups is described in steps 174 to 182. At step 174 each group of remote units 6 is sequenced for each particular poll type. The poll complete flag is cleared at step 176, then the base station 2 signals the link level to poll the group of remote units 6 in step 176. At decision 180, processing waits for completion of the poll by the link level, or a time-out if the link level can not complete the poll as requested. If the end of the polling interval for the base station 2 is reached or their time-out occurred, the polling loop is stopped at decision 181. At decision 182, the base station 2 checks the end of the remote list, and the next group is polled until all groups are completed. When all groups have been polled, the base station begins the process again at step 152.

Figure 7A:
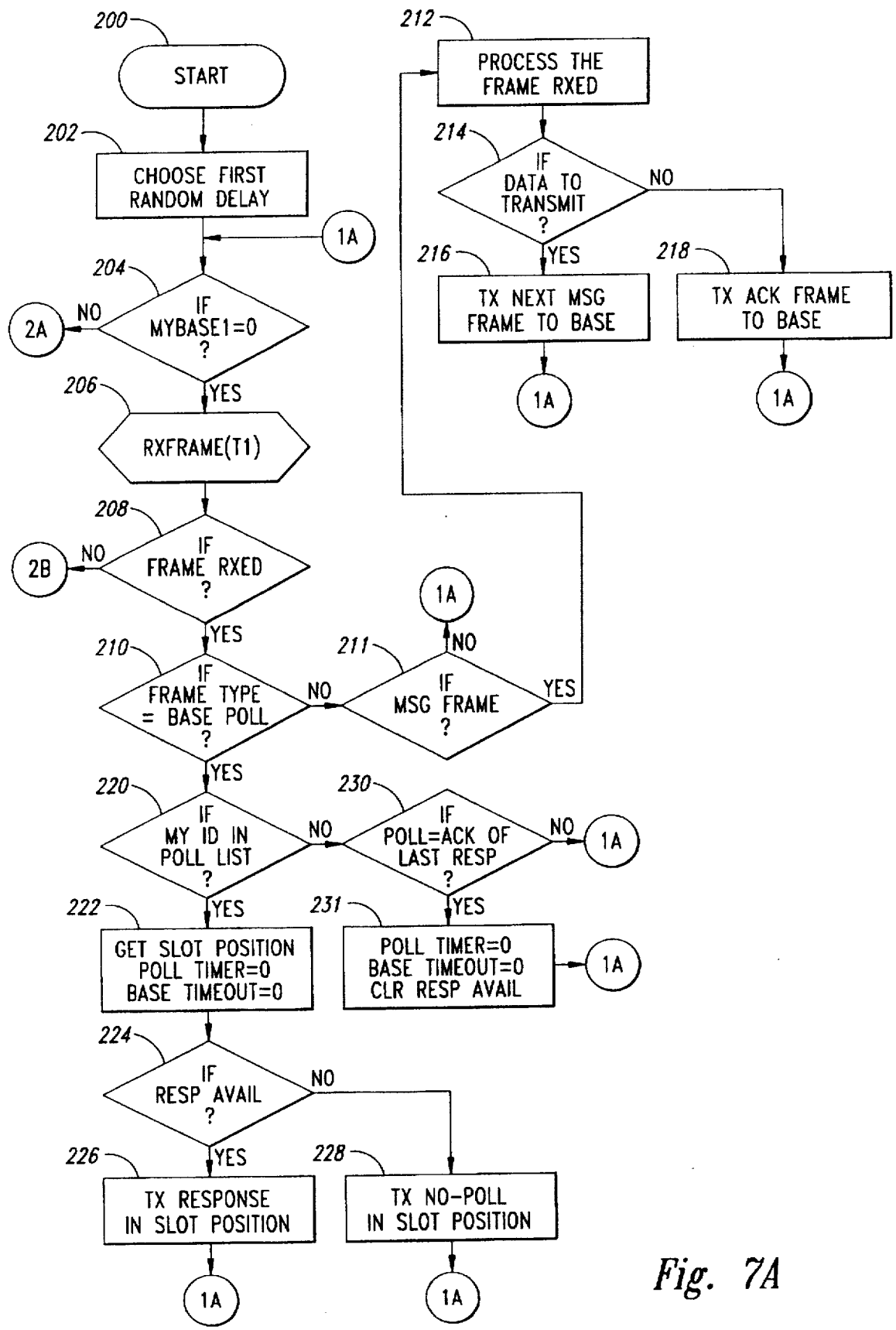
FIGS. 7A and 7B are flowcharts of the operation of the remote units of FIG. 3B when interacting with the base stations of FIG. 3A.
Figure 7B:
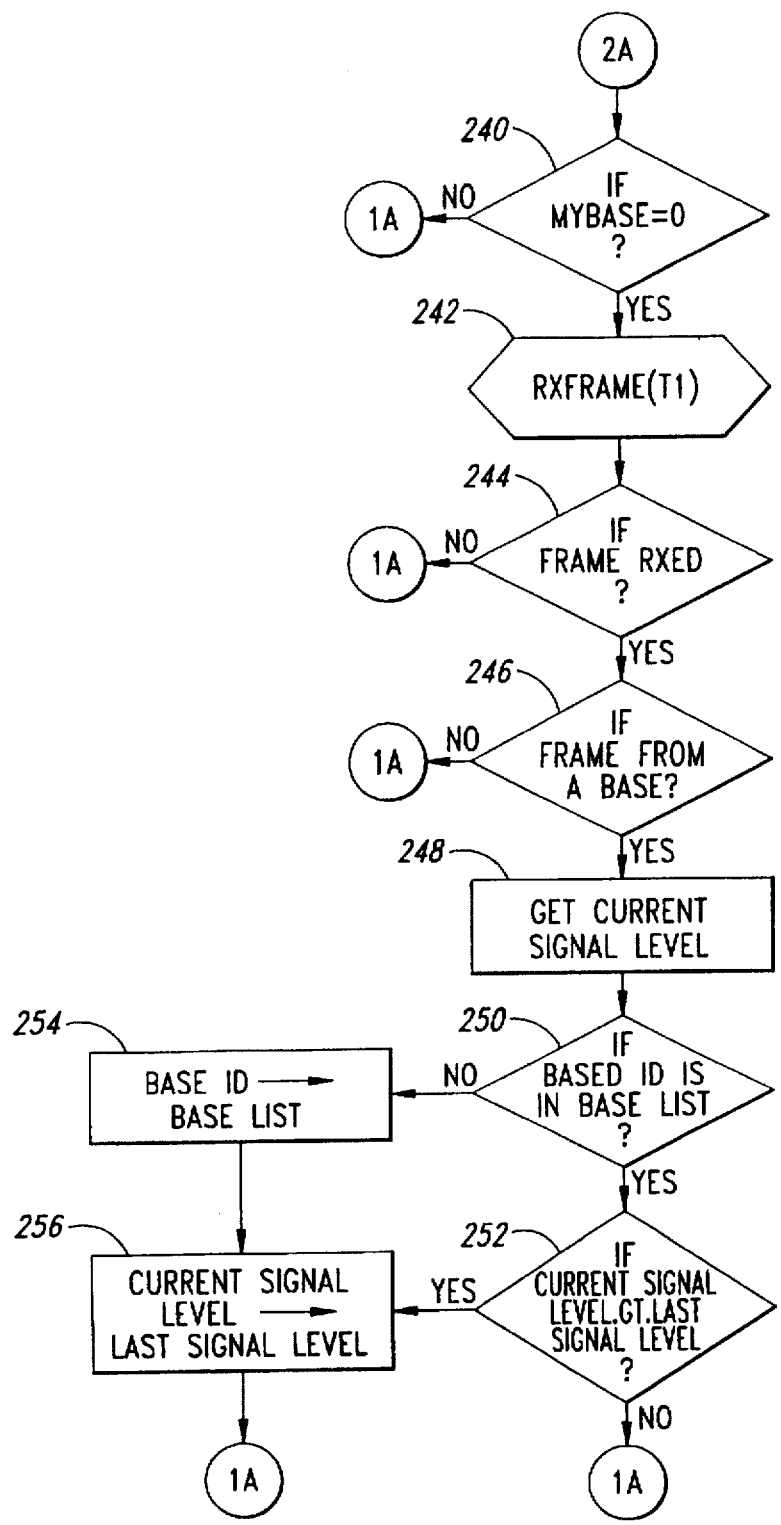
Figure 7C:
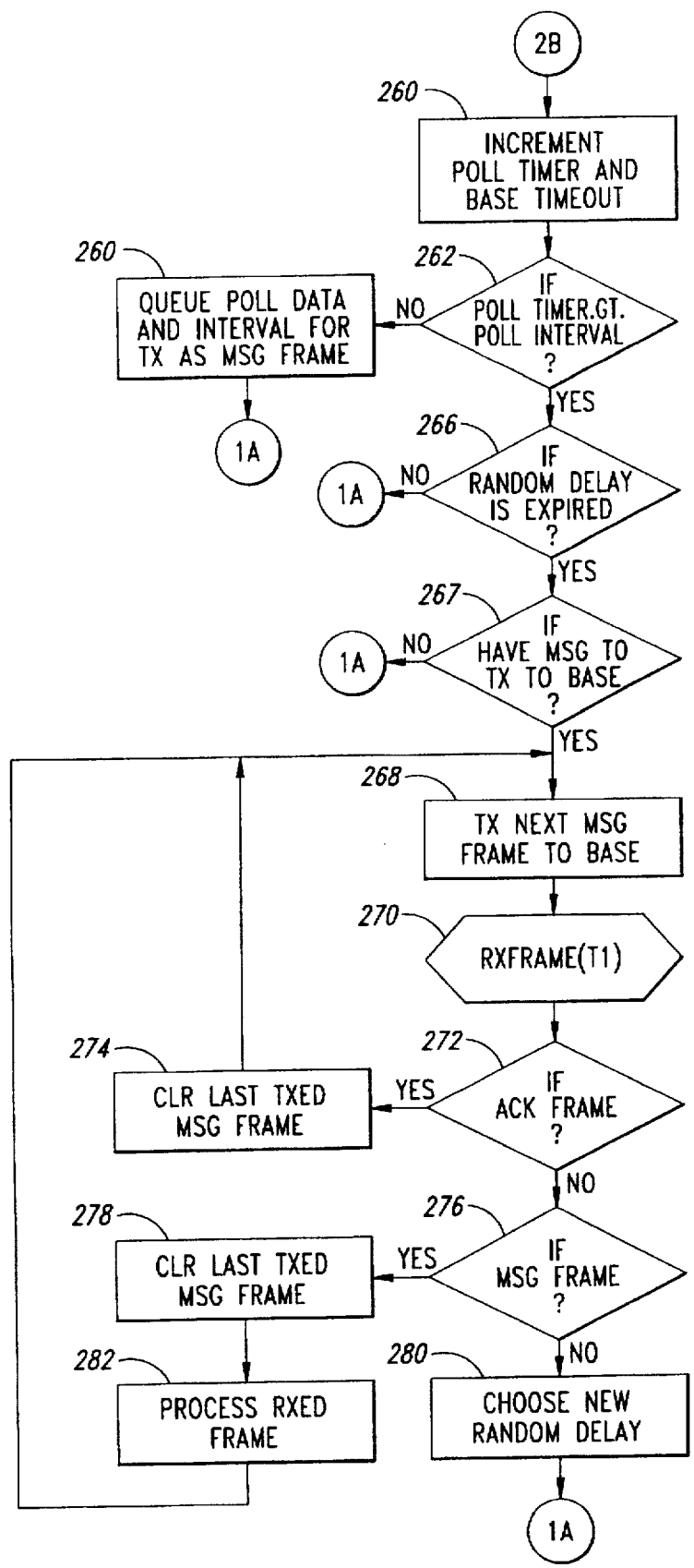

The interaction of the remote unit 6 with the base station 2 is designated as a remote level link, and is described in the flowchart of FIGS. 7A and 7B to 7C. The remote link level starts at 200 in FIG. 7A, with the re.note unit 6 choosing an initial random delay value at step 202. As previously discussed, the CSMA mode operates by randomly checking for a free link when the remote unit 6 wants to transmit message frames. If the remote unit 6 has not designated a base station 2 with which to communicate, this is detected at decision 204 and the system 30 moves to decision 240 in FIG. 7B to select a base station. Until a base station 2 has been selected, the remote unit 6 cannot transmit. However, if the remote unit 6 is unable to identify a particular base station 2 with which to communicate, the remote unit can perform a network-wide transmission, which can be received and processed by base station or remote unit. The remote link level must help the network level find a base station 2 by listening for transmissions from base stations at steps 242, 244, 246, and recording the signal levels of each base station at step 248. The base stations ID's and signal levels are put in a base list at step 254 if they are larger than the previous signal level value for that base station at decisions 250 and 252, and step 256.

Once a base station 2 has been selected, the remote unit 6 listens for a specified amount of time at step 206 and determines if the link is busy or not. If a data frame is received at decision 208, the link is not free and the received frame is checked for destination and type at decision 210.

If the frame type is a poll from the base station 2, it is checked at decision 220 to see whether the ID for the remote unit 6 is in the poll. If ID for the remote unit 6 is in the poll, then step 222 determines which slot will be used for the transmission of data from the remote unit and resets the poll and base time-outs. The slot number corresponds to the position of the remote ID in the poll frame. The proper poll response is set up at step 226 if a response is available from the remote unit 6 or step 228 if the response is not available from the remote unit. The remote unit 6 transmits its response in the correct time slot. The use of time slots for responses by the remote unit 6 will be discussed in detail below.

If the ID for the remote unit 6 is not in the poll frame at decision 220, then decision 230 determines if this poll is an acknowledgment of the last poll response by the remote unit. The remote unit makes this determination by checking the sequence number and Ack bits in the poll frame transmitted by the base station 2. The sequence number will be one greater than the last poll responded to if the last transmission was acknowledged. The Ack bits will be sequenced to indicate which of the multiple responses were received correctly in the last poll response window. If it was an acknowledge response, the data is cleared at step 231, otherwise it is left ready to transmit again on the next poll from the base station 2.

If the frame type received from the base station 2 at decision 210 is not a poll frame, and if it is a valid message frame for this remote unit 6 as determined by decision 211, the remote unit processes the data frame as a message in step 212. Decision 214 determine whether the remote unit has data to transmit to the base station. If there is data to transmit to the base station 2, the remote unit 6 transmits the next message frame at step 216 otherwise the base station transmits an acknowledge frame at step 218.

Returning again to decision 208 in FIG. 7A, if the data frame is not received, the resulted decision 208 is NO. In that event, the remote unit 6 increments the poll timer and base time out in step 260, shown in FIG. 7B. In decision 262, the base station 2 determines whether the poll timer is has exceeded the poll interval. If the poll timer has not exceeded the poll interval, the resulted decision 262 is NO and, in step 264, the remote unit 6 queues poll data and poll interval for transmission as a message frame to the base station 2. Following step 264, the remote unit 6 returns to decision 204 in FIG. 7A.

If the poll timer did exceed the poll interval, the result of decision 262 is YES. In that event, the remote unit 6 determines whether the random delay time has expired in decision 266. If the random delay time has not expired, the result of decision 266 is NO, and the program returns to decision 204 in FIG. 7A. If the random delay time has expired, the result of decision 266 is YES. In that case, in decision 267, the remote unit 6 determines whether there are any messages to transmit from the remote unit to the base station 2. If there are no messages to transmit to the base station 2, the result of decision 267 is NO, and the remote unit 6 returns to decision 204 in FIG. 7A. If the remote unit 6 has a message to transmit to the base station 2, the result of decision 267 is YES.

The loop from steps 268 to 282 shown in FIG. 7C describe the transmission of a message between the remote unit 6 and the base station 2. In step 266, the remote unit 6 transmits a message frame to the base station 2. In step 270 the remote unit waits to detect a received frame from the base station 2. In decision 272, the remote unit 6 determines whether the received frame is an acknowledgment frame. If so, in step 274, the remote unit 6 clears the last transmitted message frame and returns to step 266. If the received frame was not an acknowledgment frame, the remote unit 6 moves to decision 276 where it determines whether the received frame was a message frame. If the received frame was a message frame, the remote unit 6 clears the last transmitted message frame in step 278 and processes the newly received frame in step 282. Following the processing of the received frame, the remote unit 6 returns to step 266. If the received data frame was not a message frame, the result of decision 276 is NO, and the remote unit 6 chooses a new random delay time in step 280 and returns to decision 204 in FIG. 7A.

Figure 8A:
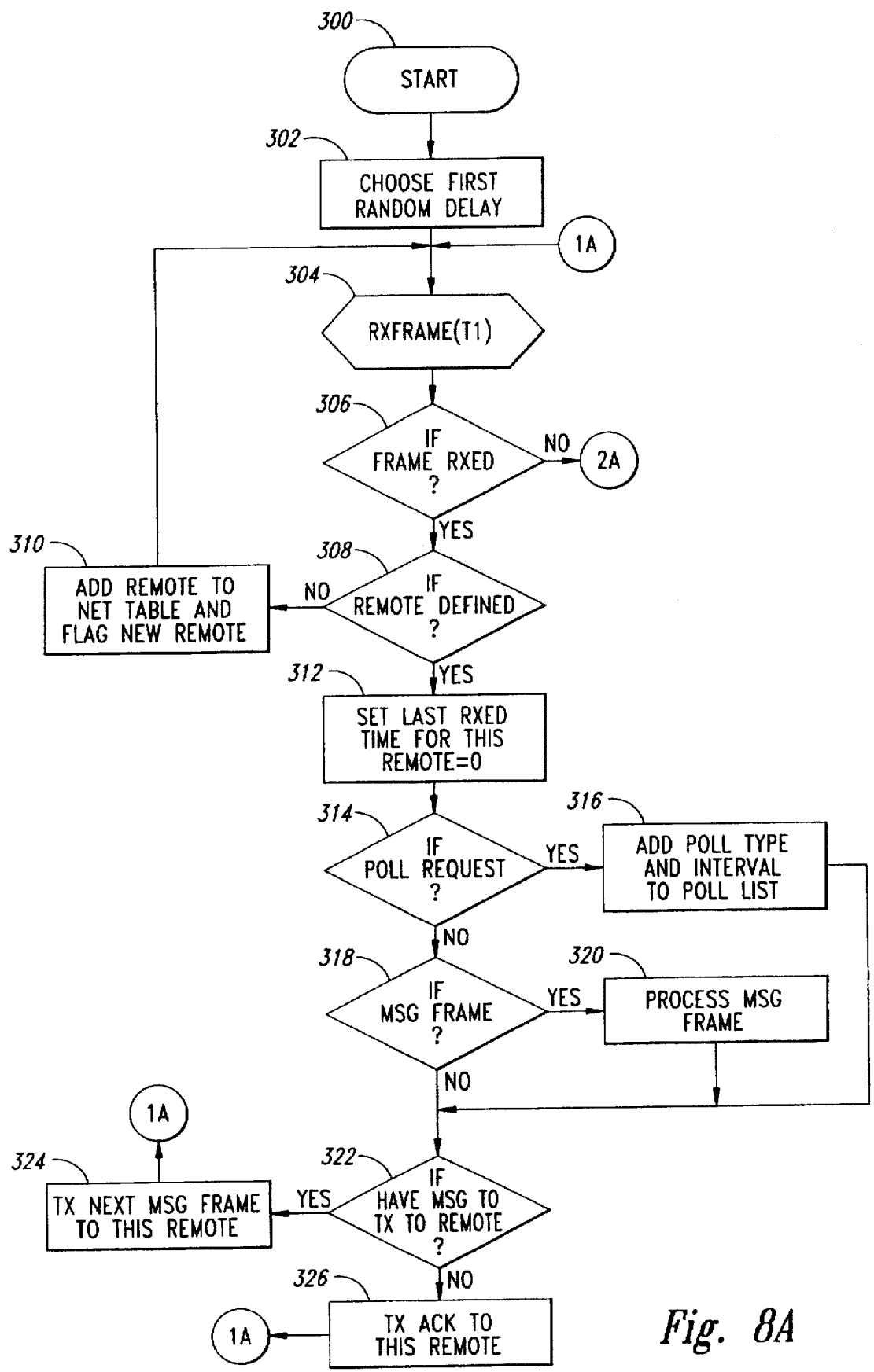
FIGS. 8A and 8B are flowcharts of the operation of the base stations of FIG. 3A when interacting with the remote units of FIG. 3B.
Figure 8B:
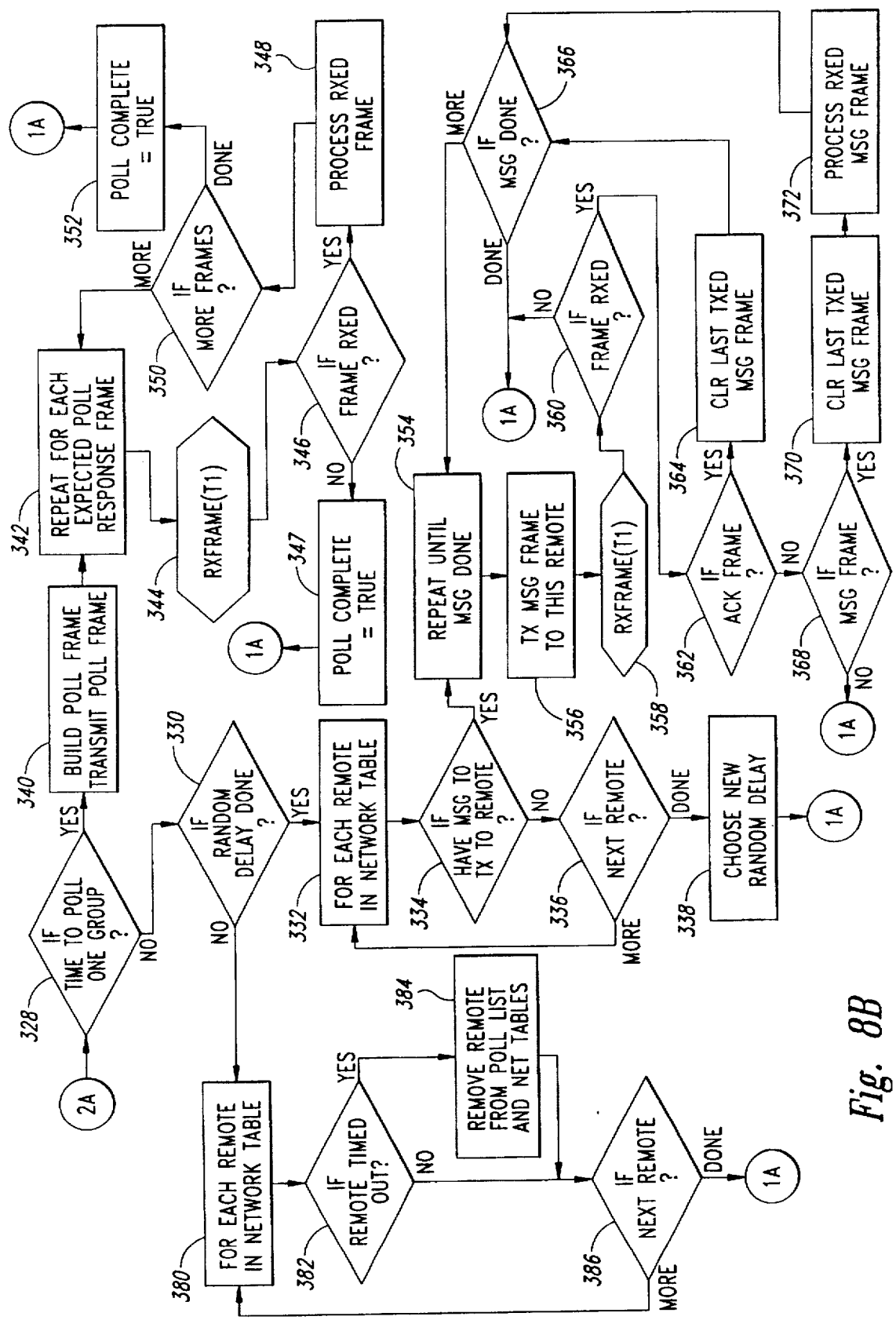

The interaction of the base station 2 with remote units 6 is designated as the base link level operation and is described in the flowchart of FIGS. 8A and 8B. The base station 2 operates in CSMA mode until a remote unit 6 needs to be polled and while receiving message frames from the remote units. Then the base station 2 switches to TDMA mode to complete any polling cycles. Lastly the base station 2 switches back to CSMA mode again. This process is described in detail starting at 300 in FIG. 8A.

The initial CSMA random delay value is chosen at step 302. The random delay is tested at decision 330, and a new value chosen at step 338. As described above for the remote unit 6, a free link is sensed at step 304 by waiting to receive a data frame. If a data frame is not received the link is free and flow goes to decision 328 in FIG. 8B to check for a group poll signaled frown the network level at step 170 (see FIG. 6). If there is no group poll and the random delay is expired at decision 330, then the base station 2 can transmit a CSMA data frame. It checks all the remote units 6 in its network table in step 332 and decision 334 and 336.

If there is a message to send to one of the remote units 6, the result of decision 334 is YES and the base station 2 executes the loop from step 354 to decision 366 to transmit to the desired remote unit. This process begins with an immediate transmission of the first message frame to the remote unit 6 at step 356, then listening for a reply from the remote at step 358. If there is a reply, decision 360 is satisfied and the reply is tested to determine if it is an acknowledgment of the transmission in decision 360, or if it is another message frame coming from the remote unit 6 in decision 368. Both cases are treated as an acknowledgment with the base station 2 clearing the last transmitted message frame at steps 364 and 370. If the reply from the remote unit 6 is another message frame, the base station process the new message frame at step 372. The message exchange continues until an error breaks the link, or until both the base station 2 and remote unit 6 run out of message frames to exchange, as determined in decision 366.

Returning again to decision 328, if there was a group poll scheduled, then the base station 2 builds a poll frame at step 340 consisting of ID's for up to "n" remote units 6 and a poll type code. The maximum number of remote units 6 polled in each group is determined by how long the remote units can remain in bit-sync, and by the desired efficiency level. As more remote units 6 are polled, the ratio of response bits to poll bits gets larger.

The poll frame is transmitted at step 340, then a loop from step 342 to decision 350 is executed to receive the responses from the remote units 6. Each response frame is received in step 344. The base station 2 must be able to receive responses from remote units 6 later in the response frame even if errors are found in the earlier responses of remote units. Once all the responses are received as determined in decision 350, or if there is a time-out in the receive frame process of step 346, the network level is notified the poll group is complete at step 347 if no more data frames are received in decision 346 and by step 352 if decision 360 determine that there are no more message frames. The time-out is computed by multiplying the number of remote units 6 to poll by the duration of each response frame which may differ for each poll type.

Returning again to FIG. 8A, if a remote message frame is received from a new remote unit 6 at decision 308, then the ID for the new remote unit is added to the network tables for the network level to set up at 160 (see FIG. 6). Also, at step 312 the time-out for each remote unit 6 is set to zero to keep the remote unit in the active network and polling table 46 (see FIG. 3A) as long as it keeps responding. At decision 314, if the frame type is a poll request, then the poll type and polling interval is added to the poll list in step 316. At decision 318, if the frame type is a message frame, then the remote unit 6 has a message for the base station 2. The message frame is processed at step 320, then a response generated at decision 322, step 324 and step 326. This process continues until the link breaks with a time-out at decision 306.

Figure 9:
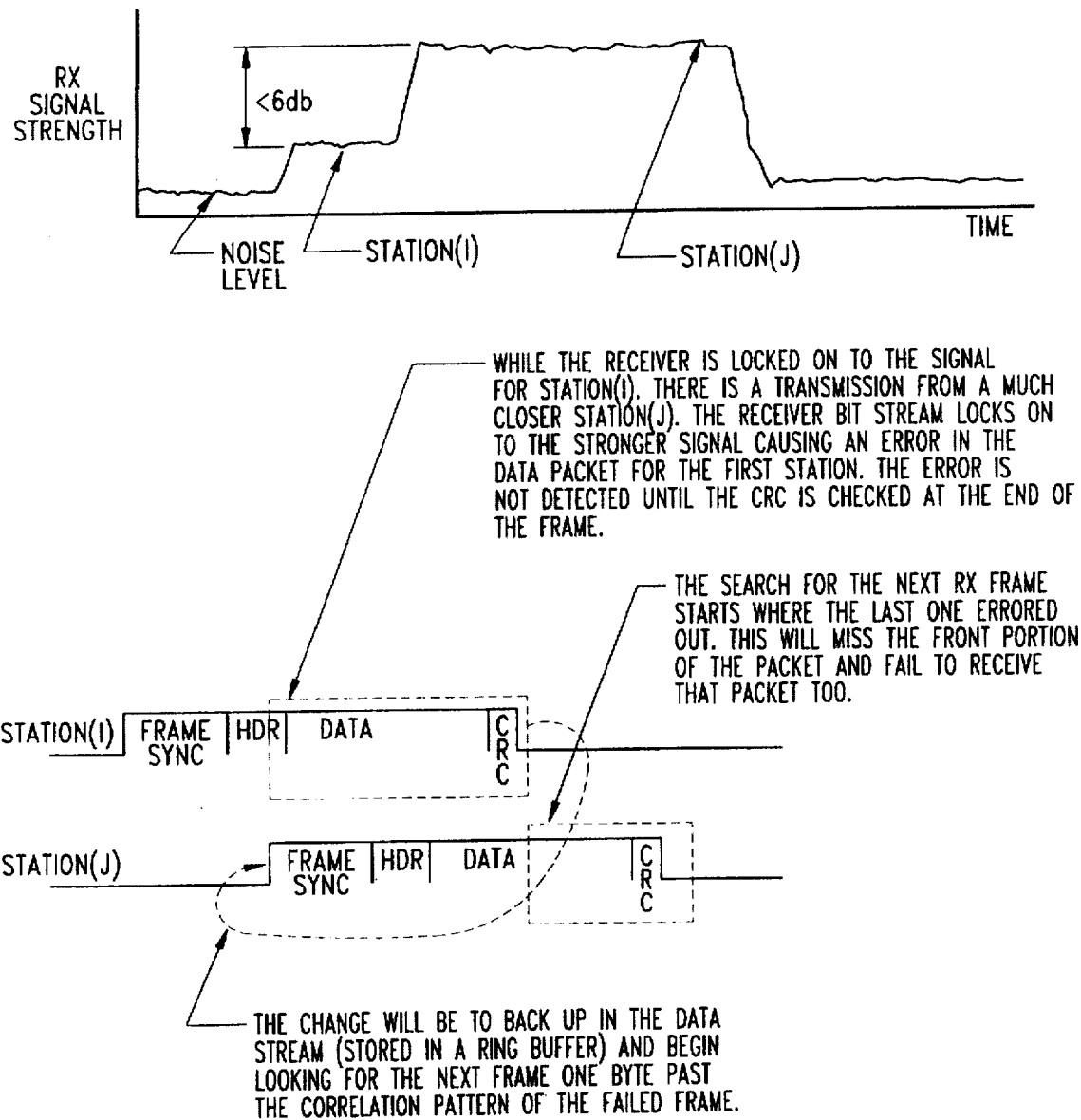
FIG. 9 is a diagram illustrating the capture of a high level signal by the base stations of FIG. 3A.

The processing of the bit stream which is output by the receiver 34 (see FIG. 3A) in the base station 2 will continuously perform scans of the incoming data to pick out packets with a good cyclic redundancy check code (CRCC). When the transmissions of two or more remote units 6 are transmitted in contention (i.e., a collision) they will be received as overlapping data. As previously discussed, the receiver 34 in the base station 2 will capture the strongest bits at any time to within a 6 db resolution. This is illustrated in FIG. 9 where the receive-bit processing receives the start of the weaker signal from station I, then receives bits of the stronger signal from station J overlaying the remainder of the packet causing the CRCC to fail. In a conventional receiver, the start of the stronger frame would be missed assuming it was data of the first packet. Thus both frames would be lost.

The system 30 stores the bit stream in a circular buffer in the memory 40 allowing the processing to back up to one byte past the start of the first frame and then scan for another packet correlation sequence whenever there was a CRCC failure. It will then find the second stronger packet with a good CRCC, and process that reception. Only the weaker bit stream is discarded rather than both. The circular buffer in the memory 40 needs to be large enough 10 to hold at least two packets, and is shifted one bit as each bit is received.

Figure 10:
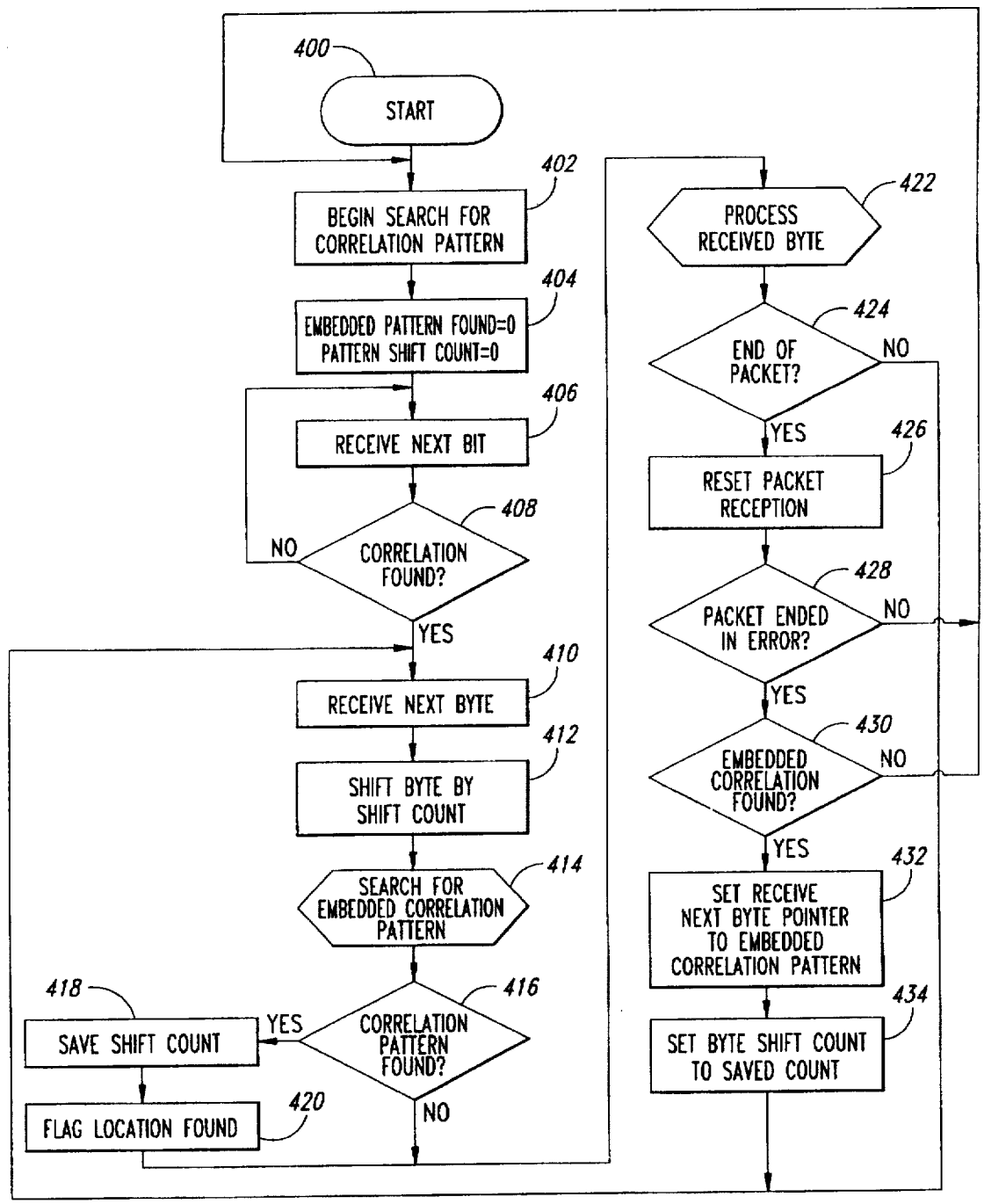
FIG. 10 is a flowchart of the operation of the base stations of FIG. 3A illustrating the capture of a high level signal.

The reception capture flow chart of FIG. 10 illustrates the operation of the system 30 to capture a strong RF transmission that interferes with a weaker data packet reception that is already in progress. The normal reception process starts at 400 when software initialization calls the receive driver to begin a search for a transmission from a remote unit 6. The search for reception begins at step 402 by initializing the search for the correlation pattern that is transmitted at the beginning of every data packet from all remote units 6 currently communicating with the particular base station 2. It also clears flags at step 404 that indicate that an embedded pattern has been found and sets a pattern shift count to zero. An embedded pattern is defined as a correlation pattern from the start of a stronger RF signal that has interfered with the initial reception.

The loop at step 406 and decision 408 is the actual search for the correlation pattern. As previously discussed, each base station 2 operates with a unique correlation pattern for its region R1 or R2 and will only communicate with remote units 6 transmitting that correlation pattern. The receiver 34 in the base station 2 continually generates a data stream from whatever signal it receives. When no remote units 6 are transmitting, there is no coherent signal and the data stream is just random bits. Thus, the correlation pattern will not be found and the system 30 loops between step 406 and decision 408. When a remote unit 6 does transmit, the receiver 34 in the base station 2 will lock on to the signal and the correlation pattern transmitted will be presented in a serial fashion at the output of the receiver in step 406. As soon as the last data bit of the correlation pattern is received correctly, decision 408 is satisfied and byte synchronization with the incoming data stream is achieved. The next 8 bits are received in step 410 to form a byte. If the pattern shift count is non-zero, the byte is shifted by the specified number of bits. Initially the shift count is set to zero in step 404. The byte is then examined in step 414 to see if it might contain a part of an embedded correlation pattern from any other remote unit 6 having a stronger RF signal. In decision 416 the system 30 determines whether an entire embedded correlation pattern has been found. If an entire embedded correlation pattern has been found, the result of decision 416 is YES and in step 418, the system 30 saves the shift count indicating how many bits "out of byte synchronization" the embedded pattern is and in step 420 flags the location in the receive buffer where the pattern was found.

If no embedded correlation pattern was found, the result of decision 416 is NO. In that case, or upon completion of step 420, the system 30 passes the current byte to be processed by the receive task in step 422. If the receive task in step 422 does not indicate that an entire packet has been received, decision 424 is NO and the system 30 returns to step 410 to receive another byte. If the packet reception is complete, the result of decision 424 is YES and in step 426 the system 30 resets the packet reception logic, which enables the base station to receive a new frame from the remote units 6. In decision 428 the system 30 determines whether the data packet reception ended in an error. As discussed above, the system 30 uses the CRCC to detect transmission errors. However, those of ordinary skill in the art will recognize that error detection schemes other than the CRCC can also be used. If the data packet reception did not end in an error, the result of decision 428 is NO and any embedded correlation pattern detected would be coincidental and can be ignored. If the result of decision 428 is NO, the system 30 re-starts the packet reception process at step 402. If the packet reception did end in an error, the result of decision 428 is YES. In that case, the system 30, in decision 430, checks to see if an embedded correlation pattern was found. If no embedded correlation pattern was found, the result of decision 430 is NO, and the system 30 re-starts the packet reception process at step 402. If an embedded correlation pattern was found, the result of decision 430 is YES, indicating that it is possible that the reception was interfered with by a stronger signal and that a good reception from the stronger, interfering unit is in progress. In that case, step 432 sets a pointer to the point in the data buffer 40a (see FIG. 3A) where the embedded correlation pattern was found. The system 30 sets the detected shift offset in step 434 and a new packet reception is immediately initiated by receiving the next byte from the receive buffer at step 410. This new packet is then received and processed normally.

The result of this process is that the stronger, interfering remote unit's transmission is not lost, but received and processed as a good reception. The receiving base station 2 can then acknowledge the new reception and the need for the interfering unit to re-transmit its data at a later time is averted. Thus, the overall efficiency of the system 30 is improved because data was not lost from two colliding remote units 6.

Figure 11:
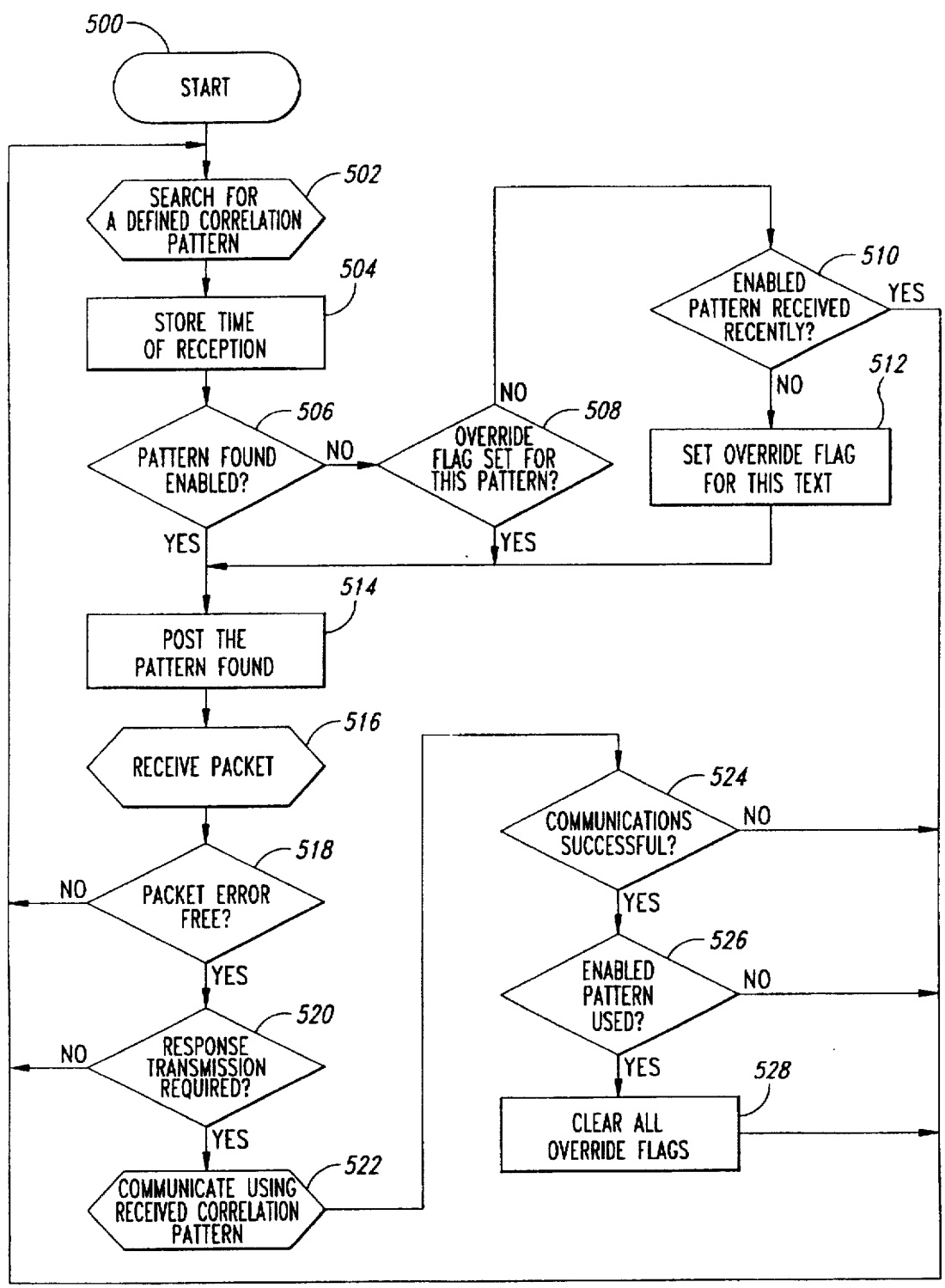
FIG. 11 is a flowchart illustrating the operation of the remote units of FIG. 3B to operate with multiple base stations.

With extended range RF equipment, the effective size of each cell C1 to C7 surrounding a base station 2 increases and thus increases the number of remote units 6 in a particular cell at any time. Each of the cells C1 to C7 overlaps the surrounding cells to some degree. As previously discussed, typical cellular phone networks use different frequencies in each adjoining cell to reduce contention. This requires each cellular phone to work with several frequencies, increasing cost and complexity of the unit. As shown in FIG. 11, the system 30 allows the use of a single frequency or channel by varying the correlation pattern or synchronization data pattern used the base station 2 in each of the cells C1 to C7. This prevents the receiver 34 in the base station 2 in the region R1 (see FIG. 1) from synchronizing with transmissions from the region R2 that use a different correlation pattern. There will still be a small level of contention, but as long as the cell size is large enough to allow the receiver 34 to capture the nearest remote units 6, as described above, there will be no loss of data packets. It should be noted that each remote unit 6 must support all of the correlation patterns in use within a network so that it can communicate with any base station 2.

The variable correlation patterns are used by the system 30 to provide logical isolation of remote units 6 that are widely separated into the regions R1 and R2 (see FIG. 1) in a large network, even when the RF characteristics of the network sometimes would allow communications between the widely separated remote units and base stations 2. By assigning different correlation patterns to the different regions R1 and PC2 of the network and assigning which correlation patterns a remote unit 6 is allowed to detect, remote units can be restricted to communications within their region of the network. However, to allow remote units 6 to roam freely throughout the entire network without the possibility of losing communications with the network or requiring continual manual configuration, overrides are provided which allow a remote unit to communicate in other areas of the network if it is unable to communicate in its assigned area.

The system 30 may assign different correlation patterns for the regions R1 and R2 (see FIG. 1) such that base stations 2 within a particular region use the same correlation pattern. This approach provides regional control of the network and prevents the base station 2 in the region R1 from communicating with the remote units 6 in the region R2. Typically, the radio transmissions between the regions R1 and R2 are at a low signal strength because of the distance separating the regions. Thus, the base stations 2 and remote units 6 in the region R1 ignore all transmissions from base stations and remote units in the region R2. The base stations 2 and remote units 6 in the region R1 are free to transmit in the CSMA mode even if they detect a transmission from a base station or remote unit in the region R2 because the base stations and remote units in the region R1 ignore the transmissions from the region R2. Although the system 30 is described herein as using different correlation patterns for the regions R1 and R2, it is possible to assign a different correlation pattern to each of the cells C1 to C7.

In the presently preferred embodiment, the correlation pattern transmitted by the remote unit 6 must match the correlation pattern of the base station 2 or the transmission will be ignored. In an alternative embodiment, the CPU 38 (see FIGS. 3A and 3B) can be programmed to detect a correlation between the transmitted correlation pattern and the correlation pattern assigned to the base station 2. If there is sufficient correlation between the transmitted correlation pattern and the correlation pattern assigned to the base station 2, the base station will process the transmission. For example, the correlation pattern, indicated by the reference letter C in FIG. 4, is 24 bits. If 20 bits out of the 24 bit correlation pattern C transmitted by the remote unit match the correlation pattern assigned to the base station 2, the base station will process the transmission. Other correlation levels may be chosen for use with the system 30.

The techniques used by the system 30 to communicate using the correlation patterns is described in the flowchart of FIG. 11. At the start 500, the software in the memory 40 (see FIGS. 3A and 3B) initializes the receive process in both the base stations 2 and the remote units 6. The base station 2 uses a fixed correlation pattern while the remote unit 6 has as many as 16 correlation patterns that are defined as valid. Any of the correlation patterns can be enabled or disabled with configuration commands. The search for any defined correlation pattern is done at step 502. When the receiver 34 detects a defined correlation pattern, the system 30, at step 504, stores the time at which the pattern was received to determine the frequency of reception of each correlation pattern. In decision 506, the system 30 tests for whether the received pattern is enabled. If the pattern is disabled, the result of decision 506 is NO, and in decision 508 the system 30 determines whether the pattern disable is in an override state. If the pattern disable is in the override state, the result of decision 508 is YES, and the reception continues at step 514. If the pattern disable is not in the override state, the result of decision 508 is NO, and the system 30, in decision 510, determines whether one of the enabled patterns in the time interval specified in the unit's configuration has been successfully received. If the unit has successfully received an enabled pattern, the disabled pattern reception is rejected and the search for correlation pattern is resumed at step 502. If the unit has not received an enabled pattern recently, the override flag for the correlation pattern received is set at step 512, allowing the unit to communicate outside of its assigned network area by proceeding to step 514.

In order to communicate with another unit, this unit must use the correlation pattern that it received from the other unit. The received correlation pattern is posted at step 514 for the transmit process. The reception of the data packet is then continued at step 516. In decision 518, the system 30 determines if the data packet was received error free. If the data packet was not received error free, the result of decision 518 is NO. In that case, the receive process resets to step 502. If the data packet was received error free, the result of decision 518 is YES, and the system 30 determines whether a response transmission is required in decision 520. If no response is required, the result of decision 520 is NO, and the receive process resets to step 502. It should be noted that the response may be immediate in response to an addressed acquire of this unit, time synchronized in response to a poll, or even randomly delayed as a CSMA response. If a response is required, the result of decision 520 is YES and the communications process continues at step 522 using the received correlation pattern. If the communications process is unsuccessful (no acknowledgment received), the result of decision 524 is NO and the system 30 resets the receive process to step 502. If the communications is successful, decision 526 determines whether the process used an enabled or disabled (i.e., using the override) correlation pattern. If the correlation pattern was enabled, the result of decision 526 is YES and the unit is restricted to communications within its assigned network area so any override flags that are set are cleared at step 528. If the correlation pattern was enabled override result of decision 526 is NO and any override flags are left set as the next reception is started by returning flow to step 502.

In one example of the system 30, a complicated system of fixed base stations 2 and remote units 6 was installed in British Columbia to allow aircraft of the Forest Protection Branch of the Ministry of Forests to be tracked, and to exchange digital messages. This was done as a part of a resource tracking system. The position of each aircraft was tracked using an on-board GPS receiver 50 (see FIG. 3B) which relays the position data to a RF modem that transmitted the position to the nearest base station 2. Each aircraft was required to deliver its position to the central computer system 8 (see FIG. 2) every 30 seconds. The RF modems used transmit a ½ duplex frame at a power of between 100 watts and 150 watts to extend the range between base stations 2 to 200 miles. This minimized the number of base stations 2 required to cover the entire Province of British Columbia. The base stations 2 were installed on mountain tops to extend range of the cells C1 to C7 (see FIG. 1) and regions R1 and R2 as much as possible. The net effect of extending the range of the cells C1 to C7 was also to increase the number of remote units 6 that could transmit in contention with one another. In addition to the increased number of aircraft included in the larger cells C1 to C7, ground based vehicles and ground based work camps also have remote units 6 that transmit to the base station 2.

The system 30 allowed the different types of remote units 6 to communicate effectively over the same channel at different polling intervals. For example, the aircraft position changes rapidly and thus requires a shorter polling interval to provide accurate position data. In contrast, a remote unit 6 at a ground based work camp changes location infrequently and thus can use a longer polling period to maintain the same level of accuracy in position data. The remote units 6 can communicate with any base station and can, if necessary, transmit information to another remote unit for relay to the base station if the remote unit is temporarily out of contact with the base station. The remote unit 6 can select any base station 2 with which to communicate and uses two operational modes to transmit data of differing priorities.

Thus, the system 30 allows flexibility in communications and greater utilization of the bandwidth than previous communications systems. The unique combination of operational modes allows for low priority data to be sent in a lower priority mode, and high priority data to be sent in the time slot allocated for that unit. The remote units can freely communicate with any base station and provisions are included to prevent reception from unauthorized remote units.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the control of radio communications, comprising:
    a plurality of remote radio units having transmit and receive capability, each of said remote units operating in a first mode to transmit a poll request signal to initiate communications, and a second mode to transmit data;
    a base station having transmit and receive capability, said base station receiving a plurality of respective poll requests from at least some of said plurality of remote radio units and transmitting a poll signal to said plurality of remote radio units, said poll signal including a poll response sequence instructing at least some remote radio units to when to respond to said poll signal;
    a poll detection unit in each of said remote radio units to detect said poll signal; and
    a control unit in each of said remote units to control transmission of said data in accordance with said poll response sequence, whereby said at least some remote radio units transmits in said second mode in accordance with said poll response sequence.

2. The system of claim 1 wherein transmissions from said base station and said plurality of remote units use a predetermined carrier frequency and said first mode is a carrier sense multiple access (CSMA) mode, the system further including a carrier sense circuit in each of said plurality of remote radio units to detect the presence of said carrier frequency, each of said remote radio units delaying a random length of time if said carrier sense circuit detects the presence of said carrier frequency and permitting transmission in said first mode only when said carrier sense circuit does not detect the presence of said carrier frequency.

3. The system of claim 1, further including a sequence list within said base station, said sequence list containing data used to form said poll response sequence.

4. The system of claim 3 wherein said poll request signal from said plurality of remote radio units contains data indicative of communications interval for each of said remote radio units, said poll detection unit receiving said communications interval data and altering said sequence list, whereby said poll response sequence reflects said altered sequence list.

5. The system of claim 1 wherein said poll request signal from said plurality of remote radio units contains data indicative of a communications interval for each of said remote radio units and said base station periodically transmits said poll signal, said poll response sequence being altered in each of said periodically transmitted poll signals in response to said communications data interval for each of said plurality of remote radio units.

6. The system of claim 1 wherein said poll signal includes a first portion and a second portion, said first portion including a plurality of synchronization data bits to indicate a start of said poll signal, said second portion including said poll response sequence.

7. The system of claim 1 wherein said poll signal includes a plurality of acknowledgment data bits for said some remote radio units to indicate prior receipt of said data from said some remote radio units.

8. The system of claim 1 wherein said poll signal includes an error check data portion at the end of said poll signal, each of said plurality of remote radio units including an error detection circuit to detect transmission errors using said error check data portion.

9. The system of claim 1 wherein each of said plurality of remote radio units periodically transmits said poll request signal to said base station and said base station uses said periodically transmitted poll request signals to alter said poll response sequence.

10. The system of claim 1, further including a global positioning system (GPS) receiver to receive position data and said position data is included in said data.

11. A system for the control of radio communications from first and second remote radio units to a base station, the first and second remote radio units transmitting to the base station a data frame having a frame synchronization sequence, a data portion and an error detection portion, the system comprising:
    a threshold detector in the base station to detect signal strength of received radio signals;
    a receiver lock circuit coupled to said threshold detector to lock the base station onto a received radio signal containing data frames, said receiver lock circuit initially locking the base station onto a first received radio signal from the first remote radio unit and locking onto a second received radio signal from the second remote radio unit if said detected signal strength of said second received radio signal is greater than said detected signal strength of said first received radio signal by a predetermined level;
    a memory sized to fit at least two data frames;
    a processor to detect the frame synchronization sequences from received radio signals and to process received data frames, said processor storing the received data frames in said memory and processing a first stored data frame received from the first remote radio unit beginning at the frame synchronization sequence and checking the data frame for an error using the error detection portion of the data frame, said processor accepting said first stored data frame if the error detection portion indicates that no error occurred, and if the error detection portion of said first stored data frame indicates than an error occurred in said first stored data frame, said processor analyzing said memory to detect another frame synchronization sequence corresponding to a second stored data frame received from the second remote radio unit beginning at the frame synchronization sequence and checking the data frame for an error using the error detection portion of the data frame, said processor accepting said second stored data frame if the error detection portion indicates that no error occurred, said processor not accepting said second stored data frame if the error detection portion indicates that an error occurred in said second stored data frame.

12. The system of claim 11 wherein the error detection portion is a cyclic redundancy check, and said processor uses the cyclic redundancy check to determine whether a transmission error occurred in said first and second stored data frames.

13. A system for the control of radio communications from a remote radio unit with a plurality of base stations using a single carrier frequency, each of the plurality of base stations using a different corresponding fixed synchronization data pattern to control communication with the remote radio unit, the system comprising:
    a receiver in the remote radio unit to receive radio signals from the plurality of base stations, each of the plurality of base stations communicating with the remote radio unit only if the remote radio unit uses the corresponding synchronization data pattern;
    a signal strength detector coupled to said receiver to determine a value indicative of a signal strength from said received receive radio signals from the plurality of base stations;
    a station selector to select one of the plurality of base stations with which to communicate based on said signal strength value; and
    a data storage location containing a data frame in the remote radio unit, said data frame having a frame synchronization portion including a synchronization data pattern corresponding to said one base station if said signal strength detector determines that said signal strength from said one base station is greater than said signal strength from the remaining ones of the plurality of base station.

14. A system for the control of radio communications from a remote radio unit to a first and second base stations using a single carrier frequency, the system comprising:
    a first fixed synchronization data pattern associated with the first base station to control communication with the remote radio unit, the first base station communicating with the remote radio unit only if the remote radio unit uses said first fixed synchronization data pattern;
    a second fixed synchronization data pattern different from said first fixed synchronization data pattern associated with the second base station to control communication with the remote radio unit, the second base station communicating with the remote radio unit only if the remote radio unit uses said second fixed synchronization data pattern;
    a receiver portion in the remote radio unit to receive radio signals from both the first and second base stations, said receiver portion determining a signal strength from said received receive radio signals from both the first and second base stations, said receiver portion selecting either said first base station or said second base station for subsequent transmissions based on said signal strength; and
    a data storage area containing a data frame in the remote radio unit, said data frame having a frame synchronization portion including said first fixed synchronization data pattern if said receiver portion determines that said signal strength from the first base station is greater than said signal strength from the second base station, and including said second fixed synchronization data pattern if said receiver portion determines that said signal strength from the second base station is greater than said signal strength from the first base station, whereby the remote radio station communicates with either the first or second base station.

15. The system of claim 14 wherein said receiver portion continues to monitor received radio signals from the first and second base stations and alters the included fixed synchronization data pattern if said signal strength from said first and second received radio signals changes, whereby the remote radio unit switches base stations with which it is communicating.

16. A system for the control of radio communications between a plurality of remote radio units and a first base station using a single carrier frequency, the system comprising:

a first fixed correlation data pattern associated with the first base station to control communication with the plurality of remote radio units;

a receiver within the first base station to receive radio signals from the plurality of remote units, said radio signals including a received correlation data pattern and additional data;

a correlation analyzer within the first base station and coupled to said receiver to detect said received correlation data pattern, said pattern detector generating a correlation value indicative of a correlation between said received correlation data pattern and said first fixed correlation data pattern; and a processor within the first base station to process said received additional data only if said correlation value is above a predetermined threshold, whereby the first base station only process said additional data only from the ones of the plurality of remote units that transmit a correlation pattern sufficiently correlated with said first fixed synchronization data pattern.

17. The system of claim 16 for use with a second base station, the system further including:

a second fixed correlation data pattern different from said first fixed correlation data pattern associated with the second base station to control communication with the plurality of remote radio units;

a receiver within the second base station to receive radio signals from the plurality of remote units, said radio signals including a received correlation data pattern and additional data;

a correlation analyzer within the second base station and coupled to said receiver to detect said received correlation data pattern, said pattern detector generating a correlation value indicative of a correlation between said received correlation data pattern and said second fixed correlation data pattern; and a processor within the second base station to process said received additional data only if said correlation value is above a predetermined threshold, whereby the first base station only process said additional data only from the ones of the plurality of remote units that transmit a correlation pattern sufficiently correlated with said first fixed synchronization data pattern, and the second base station only process said additional data only from the ones of the plurality of remote units that transmit a correlation pattern sufficiently correlated with said second fixed synchronization data pattern.

18. A method for the control of radio communications, comprising:

transmitting a poll request signal from each of a plurality of remote radio units to initiate communications using a first communications mode;

receiving, in a base station, a plurality of respective poll request signals from said plurality of remote radio units;

in response to said plurality of poll request signals, transmitting a poll signal from said base station to said plurality of remote radio units, said poll signal including a poll response sequence instructing at least some remote radio units when to respond to said poll signal;

detecting said poll signal in said at least some remote radio units; and transmitting data in accordance with said poll response sequence, whereby said at least some remote radio units transmits in said second mode in accordance with said poll response sequence.

19. The method of claim 18, further including the step of analyzing said poll response sequence in said at least some remote units, said step of transmitting being performed only by said at least some remote units that are included in said poll response sequence.

20. The method of claim 18 wherein transmissions from said base station and said plurality of remote units use a predetermined carrier frequency and said first mode is a carrier sense multiple access (CSMA) mode, the method further the step of detecting the presence of said carrier frequency before transmitting, each of said remote radio units delaying a random length of time if the presence of said carrier frequency is detected and permitting transmission in said first mode only when said the presence of said carrier frequency is not detected.

21. The method of claim 18 wherein said remote units include a selectively activated transmitter that is selectively activated, said transmitter being selectively activated for said step of transmitting said poll request signal, the method further including the steps of transmitting said data continuously in all time frames designated in said poll signal, and selectively activating said transmitter only during said particular time frame.

22. The method of claim 18, further including the step of constructing a sequence list within said base station, said sequence list containing data used to form said poll response sequence.

23. The method of claim 22 wherein said poll request signal from said plurality of remote radio units contains data indicative of a communications interval for each of said remote radio units, said base station performing the step of receiving said communications interval data and altering said sequence list, whereby said poll response sequence reflects said altered sequence list.

24. The method of claim 18 wherein said poll request signal from said plurality of remote radio units contains data indicative of a communications interval for each of said remote radio units, said base station periodically transmitting said poll signal in response to said communications interval.

25. The method of claim 18 wherein said poll signal includes an error check data portion at the end of said poll signal, the method further including the step of detecting transmission errors using said error check data portion.

26. The method of claim 25 wherein said error check data portion is a cyclic redundancy code.

27. The method of claim 18 wherein at least some of said plurality of remote radio units periodically transmit said poll request signal to said base station, the method further including the step of altering said poll response sequence in response to said periodically transmitted poll request signals.

28. The method of claim 18, further including the steps of generating global positioning data and including said position data in said transmitted data.

29. The method of claim 18 further including the step of transmitting an acknowledgment signal from said base station to said plurality of remote units, said acknowledgment signal indicative of a successful reception of said transmitted data.

30. The method of claim 29 wherein said base station transmits a plurality of said poll signals and said acknowledgment signal is included in one of said poll signals to indicate successful reception of said transmitted data transmitted by said at least some of said remote units in response to a previous one of said poll signals.

31. A method for the control of radio communications from first and second remote radio units to a base station, the first and second remote radio units transmitting to the base station a data frame having a frame synchronization sequence, a data portion and an error detection portion, the method comprising the steps of:

receiving in the base station, a first received radio signal from the first remote radio unit;

receiving in the base station, a second received radio signal from the second remote radio unit if said second received radio signal has a greater signal strength than said first received radio signal;

storing the data received as part of said first and second received radio signals;

analyzing said stored data and detecting the data frame from the first received radio signal beginning at the frame synchronization sequence;

checking the data frame from the first received radio signal for an error using the error detection portion of the data frame;

accepting the data frame from the first received radio signal if the error detection portion indicates that no error occured;

if the error detection portion of the data frame from the first received radio signal indicates than an error occurred in the data frame from the first received radio signal, analyzing said stored data to detect another frame synchronization sequence corresponding to the data frame from the second received radio signal beginning at said another frame synchronization sequence and checking the data frame from the second received radio signal for an error using the error detection portion of the data frame from the second received radio signal;

accepting the data frame from the second received radio signal if the error detection portion indicates that no error occurred; and not accepting the data frame from the second received radio signal if the error detection portion indicates that an error occurred in the data frame from the second received radio signal.

32. The method of claim 31 wherein the error detection portion is a cyclic redundancy check, and said step of accepting the data frame from the first or second received radio signals uses the cyclic redundancy check to determine whether a transmission error occurred in the data frame from the first or second received radio signals.

33. A method for the control of radio communications from a remote radio unit with a plurality of base stations using a single carrier frequency, each of the plurality of base stations using a different corresponding fixed synchronization data pattern to control communication with the remote radio unit, the method comprising the steps of:

receiving in the remote radio unit radio signals from the plurality of base stations, each of the plurality of base stations communicating with the remote radio unit only if the remote radio unit uses the corresponding synchronization data pattern;

determining a value indicative of a signal strength from said received receive radio signals from the plurality of base stations;

selecting one of the plurality of base stations with which to communicate based on said signal strength value; and generating a data frame in the remote radio unit having a synchronization data pattern corresponding to said one base station.

34. A method for the control of radio communications from a remote radio unit to a first and second base stations using a single carrier frequency, the method comprising the steps of:

assigning a first fixed synchronization data pattern to the first base station to control communication with the remote radio unit, the first base station communicating with the remote radio unit only if the remote radio unit uses said first fixed synchronization data pattern;

assigning a second fixed synchronization data pattern different from said first fixed synchronization data pattern to the second base station to control communication with the remote radio unit, the second base station communicating with the remote radio unit only if the remote radio unit uses said second fixed synchronization data pattern;

receiving radio signals from both the first and second base stations in the remote unit;

analyzing the received radio signals from both the first and second base stations in the remote unit;

selecting either said first base station or said second base station for subsequent transmissions based on said analysis;

generating a data frame in the remote radio unit having a frame synchronization portion including said first fixed synchronization data pattern if said step of selecting selects the first base station; and generating said data frame in the remote radio unit having a frame synchronization portion including said second fixed synchronization data pattern if said step of selecting selects the second base station.

35. The method of claim 34 wherein said step of analysis determines received signal strength from the first and second received radio signals, said step of selecting basing said selection on said received signal strength.

36. The method of claim 35 wherein said step of selecting basing said selection on said received signal strength selects the first base station if said signal strength from the first base station is greater than said signal strength from the second base station, and selecting the second base station if said signal strength from the second base station is greater than said signal strength from the first base station.

37. The method of claim 34 wherein said step of analyzing continues to analyze said received radio signals from the first and second base stations, the method further including the step of altering said step of selection to select the other of the first and second base stations, whereby the remote radio unit switches base stations with which it is communicating.

38. A method for the control of radio communications between a plurality of remote radio units and a first base station using a single carrier frequency, the method comprising the steps of:

associating a first fixed correlation data pattern with the first base station to control communication with the plurality of remote radio units;

within the first base station, receiving radio signals from the plurality of remote units, said radio signals including a received correlation data pattern and additional data;

within the first base station, detecting said received correlation data pattern and generating a correlation value indicative of a correlation between said received correlation data pattern and said first fixed correlation data pattern; and within the first base station, processing said received additional data only if said correlation value is above a predetermined threshold, whereby the first base station only process said additional data only from the ones of the plurality of remote units that transmit a correlation pattern sufficiently correlated with said first fixed synchronization data pattern.

39. The method of claim 38 for use with a second base station, the method further including the steps of:

associating with the second base station a second fixed correlation data pattern different from said first fixed correlation data pattern to control communication with the plurality of remote radio units;

within the second base station, receiving radio signals from the plurality of remote units, said radio signals including a received correlation data pattern and additional data;

within the second base station, detecting said received correlation data pattern and generating a correlation value indicative of a correlation between said received correlation data pattern and said second fixed correlation data pattern; and within the second base station, processing said received additional data only if said correlation value is above a predetermined threshold, whereby the first base station only process said additional data only from the ones of the plurality of remote units that transmit a correlation pattern sufficiently correlated with said first fixed synchronization data pattern, and the second base station only process said additional data only from the ones of the plurality of remote units that transmit a correlation pattern sufficiently correlated with said second fixed synchronization data pattern.

40. A system for the control of radio communications, comprising:

a plurality of remote radio units having transmit and receive capability, each of said remote units operating in a first mode to transmit a poll request signal to initiate communications, and a second mode to transmit data;

a plurality of base stations having transmit and receive capability, each of said base stations sequentially transmitting a poll signal to said plurality of remote radio units, said poll signal including a poll response sequence instructing at least some remote radio units to when to respond to said poll signal; and a central controller communicating with each of said base stations and providing polling assignment commands to each of said base stations to instruct each of said base stations when to transmit said poll signal, whereby each of said base station transmits said poll signal in accordance with said polling assignment commands.

41. The system of claim 40, further including a timer within each of said base stations, said timer being used by said base stations to transmit said poll signal in accordance with said polling assignment commands.

42. The system of claim 41, further including a master timer within said central controller, said central controller periodically transmitting time signals to said timer in each of said base stations to synchronize said timer within each of said base stations with said master timer.

* * * * *